US010189180B2

(12) United States Patent
Wittbold et al.

(10) Patent No.: US 10,189,180 B2
(45) Date of Patent: Jan. 29, 2019

(54) FOAM INJECTION SYSTEM WITH VARIABLE PORT INSERTS FOR SLURRY MIXING AND DISPENSING APPARATUS

(71) Applicant: United States Gypsum Company, Chicago, IL (US)

(72) Inventors: James Wittbold, Des Plaines, IL (US); Luis Carrazco, Valparaiso, IN (US)

(73) Assignee: United States Gypsum Company, Chicago, IL (US)

( * ) Notice: Subject to any disclaimer, the term of this patent is extended or adjusted under 35 U.S.C. 154(b) by 813 days.

(21) Appl. No.: 14/527,417

(22) Filed: Oct. 29, 2014

(65) Prior Publication Data

US 2015/0197036 A1      Jul. 16, 2015

Related U.S. Application Data

(60) Provisional application No. 61/927,881, filed on Jan. 15, 2014.

(51) Int. Cl.
*B01F 5/04* (2006.01)
*B01F 3/08* (2006.01)
(Continued)

(52) U.S. Cl.
CPC .............. *B28C 5/381* (2013.01); *B01F 3/088* (2013.01); *B01F 3/0865* (2013.01); *B01F 5/048* (2013.01);
(Continued)

(58) Field of Classification Search
CPC ......... B28C 5/381; B28C 7/0413; B28C 5/06; B28C 5/026; B28C 5/04; B28C 7/12;
(Continued)

(56) References Cited

U.S. PATENT DOCUMENTS 1,733,018 A * 10/1929 Hinton .................... B28C 5/386
                                                      366/10
2,861,714 A * 11/1958 Ashmore ............... B65D 7/045
                                                      206/522
(Continued)

FOREIGN PATENT DOCUMENTS

CN          102946984 A       2/2013

OTHER PUBLICATIONS

European Patent Office, International Search Report in International Patent Application No. PCT/US2015/011154, dated Apr. 24, 2015.
(Continued)

*Primary Examiner* — Joseph W Drodge
(74) *Attorney, Agent, or Firm* — Leydig, Voit & Mayer, Ltd.; Philip T. Petti; Pradip K. Sahu

(57) ABSTRACT

A foam injection system for use in the manufacture of cementitious products includes a foam injection body and first and second port inserts. The foam injection body defines a slurry passageway and a port passageway having a port opening in fluid communication with the slurry passageway. The first and second port inserts respectively define first and second foam passageways having first and second orifice sizes. The first and second orifice sizes are different. The first and second port inserts are adapted to removably mount to the foam injection body such that the respective foam passageway is in fluid communication with the slurry passageway via the port opening of the port passageway. One port insert can be replaced with another to readily vary the pressure of the foam passing through the particular port insert and injected into a cementitious slurry traveling through the slurry passageway.

28 Claims, 12 Drawing Sheets

(51) Int. Cl.
*B28B 19/00* (2006.01)
*B28C 5/38* (2006.01)
*B28C 5/06* (2006.01)
*B28C 7/04* (2006.01)
*B01F 15/04* (2006.01)

(52) U.S. Cl.
CPC ........ *B01F 5/0471* (2013.01); *B01F 15/0412* (2013.01); *B28B 19/0092* (2013.01); *B28C 5/06* (2013.01); *B28C 7/0413* (2013.01); *Y10T 137/87652* (2015.04)

(58) Field of Classification Search
CPC . B28C 7/126; B28C 7/128; B28C 7/14; B01F 5/0471; B01F 3/0865; B01F 3/088; B01F 15/0412; B01F 5/048; B01F 5/04; B01F 5/0403; B01F 5/0405; B01F 5/0406; B01F 5/0411; B01F 5/043; B01F 3/04; B01F 3/04099; B01F 3/0446; B01F 3/04446; B01F 15/04; B28B 19/0092; Y10T 137/87652; B05B 7/26; B05B 7/262; B05B 7/28; B05B 7/30
USPC ........ 137/802, 896; 239/310, 311, 398, 428, 239/433, 434, 5; 366/10, 11, 101, 107, 366/150.1, 162.4, 177.1, 178.1, 178.2, 366/182.1, 341, 34, 1
See application file for complete search history.

(56) References Cited

U.S. PATENT DOCUMENTS

| | | |
|---|---|---|
| 2,915,301 A | 12/1959 | Selden |
| 3,359,146 A | 12/1967 | Lane et al. |
| 4,057,443 A | 11/1977 | Stiling et al. |
| 4,265,964 A | 5/1981 | Burkhart |
| 4,474,680 A * | 10/1984 | Kroll .................. B01F 3/04446 169/15 |
| 4,676,938 A * | 6/1987 | Karklin ................ B29C 44/146 264/46.5 |
| 4,789,244 A | 12/1988 | Dunton et al. |
| 4,797,003 A | 1/1989 | Cameron et al. |
| 4,872,913 A | 10/1989 | Dunton et al. |
| 5,105,843 A | 4/1992 | Condron et al. |
| 5,141,363 A | 8/1992 | Stephens |
| 5,320,677 A | 6/1994 | Baig |
| 5,393,341 A | 2/1995 | Meier et al. |
| 5,419,632 A | 5/1995 | Stephens |
| 5,643,510 A | 7/1997 | Sucech |
| 5,683,635 A | 11/1997 | Sucech et al. |
| 5,690,729 A | 11/1997 | Jones, Jr. |
| 5,714,001 A | 2/1998 | Savoly et al. |
| 5,795,060 A | 8/1998 | Stephens |
| 5,900,191 A | 5/1999 | Gray et al. |
| 6,046,255 A | 4/2000 | Gray et al. |
| 6,059,444 A | 5/2000 | Johnson et al. |
| 6,153,005 A | 11/2000 | Welker et al. |
| 6,342,284 B1 | 1/2002 | Yu et al. |
| 6,409,823 B1 | 6/2002 | Shake et al. |
| 6,425,950 B1 * | 7/2002 | Leitsch ............... B01F 3/04985 106/672 |
| 6,444,088 B2 | 9/2002 | Rokman et al. |
| 6,485,561 B1 | 11/2002 | Dattel |
| 6,494,609 B1 | 12/2002 | Wittbold et al. |
| 6,632,550 B1 | 10/2003 | Yu et al. |
| 6,676,862 B2 | 1/2004 | Jensen |
| 6,706,128 B2 | 3/2004 | Sethuraman |
| 6,742,922 B2 | 6/2004 | Shrader et al. |
| 6,773,500 B1 | 8/2004 | Creamer et al. |
| 6,774,146 B2 | 8/2004 | Savoly et al. |
| 6,800,131 B2 | 10/2004 | Yu et al. |
| 6,805,199 B2 | 10/2004 | Surjaatmadja |
| 6,874,930 B2 | 4/2005 | Wittbold et al. |
| 7,007,914 B2 | 3/2006 | Petersen et al. |
| 7,296,919 B2 | 11/2007 | Petersen et al. |
| 7,404,917 B2 | 7/2008 | Gannaway et al. |
| 7,503,430 B2 | 3/2009 | Englert et al. |
| 7,544,242 B2 | 6/2009 | Liu et al. |
| 7,637,996 B2 | 12/2009 | Blackburn et al. |
| 7,654,807 B2 | 2/2010 | Gannaway et al. |
| 7,686,902 B2 | 3/2010 | Kimura et al. |
| 7,690,834 B2 | 4/2010 | Nakamura et al. |
| 7,691,467 B2 | 4/2010 | Kimura et al. |
| 7,718,019 B2 | 5/2010 | Wittbold et al. |
| 7,731,794 B2 | 6/2010 | Yu et al. |
| 7,736,720 B2 | 6/2010 | Yu et al. |
| 7,767,019 B2 | 8/2010 | Liu et al. |
| 7,776,170 B2 | 8/2010 | Yu et al. |
| 7,776,461 B2 | 8/2010 | Blackburn et al. |
| 7,776,462 B2 | 8/2010 | Liu et al. |
| 7,803,296 B2 | 9/2010 | Miller et al. |
| 7,819,971 B2 | 10/2010 | Stocco et al. |
| 7,819,993 B2 | 10/2010 | Seki et al. |
| 7,875,114 B2 | 1/2011 | Wittbold et al. |
| 7,927,413 B2 | 4/2011 | Brock et al. |
| 7,942,658 B1 | 5/2011 | Jensen |
| 8,016,960 B2 | 9/2011 | Wittbold et al. |
| 8,016,961 B2 | 9/2011 | Martin et al. |
| 8,057,915 B2 | 11/2011 | Song et al. |
| 8,088,218 B2 | 1/2012 | Blackburn et al. |
| 8,119,207 B2 | 2/2012 | Rigaudon et al. |
| 8,142,915 B2 | 3/2012 | Blackburn et al. |
| 8,197,952 B2 | 6/2012 | Yu et al. |
| 8,201,986 B2 | 6/2012 | Emerson et al. |
| 8,257,489 B2 | 9/2012 | Yu et al. |
| RE44,070 E | 3/2013 | Yu et al. |
| 8,444,787 B2 | 5/2013 | Wittbold et al. |
| 8,597,426 B2 | 12/2013 | Lee et al. |
| 8,801,852 B2 | 8/2014 | Lee et al. |
| 2002/0045074 A1 | 4/2002 | Yu et al. |
| 2003/0117891 A1 | 6/2003 | Wittbold et al. |
| 2004/0231916 A1 | 11/2004 | Englert et al. |
| 2005/0019618 A1 | 1/2005 | Yu et al. |
| 2005/0253098 A1 | 11/2005 | Petersen et al. |
| 2006/0035112 A1 | 2/2006 | Veeramasuneni et al. |
| 2006/0045975 A1 | 3/2006 | Yamaji et al. |
| 2006/0092759 A1 | 5/2006 | Petersen et al. |
| 2006/0244182 A1 | 11/2006 | Wittbold et al. |
| 2006/0244183 A1 | 11/2006 | Wittbold et al. |
| 2006/0278127 A1 | 12/2006 | Liu et al. |
| 2006/0278128 A1 | 12/2006 | Liu et al. |
| 2006/0278133 A1 | 12/2006 | Yu et al. |
| 2007/0008813 A1 | 1/2007 | Kranzinger |
| 2007/0022913 A1 | 2/2007 | Wang et al. |
| 2007/0047383 A1 | 3/2007 | Williams et al. |
| 2007/0048490 A1 | 3/2007 | Yu et al. |
| 2007/0059513 A1 | 3/2007 | Yu et al. |
| 2008/0000392 A1 | 1/2008 | Blackburn et al. |
| 2008/0009565 A1 | 1/2008 | Wittbold et al. |
| 2008/0070026 A1 | 3/2008 | Yu et al. |
| 2008/0090068 A1 | 4/2008 | Yu |
| 2008/0101151 A1 | 5/2008 | Frank et al. |
| 2008/0310248 A1 | 12/2008 | Rigaudon et al. |
| 2009/0169864 A1 | 7/2009 | Wang et al. |
| 2010/0011994 A1 | 1/2010 | Blackburn et al. |
| 2010/0056655 A1 | 3/2010 | Liu et al. |
| 2010/0291305 A1 | 11/2010 | Wittbold et al. |
| 2011/0054053 A1 | 3/2011 | Lee et al. |
| 2011/0195241 A1 | 8/2011 | Yu et al. |
| 2011/0213043 A1 | 9/2011 | Blackburn et al. |
| 2011/0293916 A1 | 12/2011 | Martin et al. |
| 2011/0305102 A1 | 12/2011 | Berger et al. |
| 2011/0308432 A1 | 12/2011 | Wittbold et al. |
| 2012/0167805 A1 | 7/2012 | Wittbold et al. |
| 2012/0168527 A1 | 7/2012 | Li et al. |
| 2012/0170403 A1 | 7/2012 | Li et al. |
| 2012/0172468 A1 | 7/2012 | Blackburn et al. |
| 2012/0214887 A1 | 8/2012 | Stav et al. |
| 2012/0236677 A1 | 9/2012 | Emerson et al. |
| 2012/0251813 A1 | 10/2012 | Yu et al. |
| 2012/0308463 A1* | 12/2012 | Li ...................... B01F 3/04446 423/265 |
| 2012/0312193 A1 | 12/2012 | Jezequel et al. |

(56) References Cited

U.S. PATENT DOCUMENTS

| | | |
|---|---|---|
| 2012/0315464 A1 | 12/2012 | Refouvelet et al. |
| 2012/0318171 A1 | 12/2012 | Jezequel et al. |
| 2013/0037277 A1 | 2/2013 | Henry |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0170314 A1 | 7/2013 | Hansson |
| 2013/0199746 A1 | 8/2013 | Peltonen et al. |
| 2013/0216717 A1 | 8/2013 | Rago et al. |
| 2013/0233805 A1 | 9/2013 | Revington et al. |
| 2013/0233880 A1 | 9/2013 | Rago et al. |
| 2013/0308411 A1 | 11/2013 | Wittbold et al. |
| 2014/0073711 A1 | 3/2014 | Lee et al. |
| 2014/0201120 A1* | 7/2014 | Lydon .................. G06F 21/316 706/46 |

OTHER PUBLICATIONS

European Patent Office, Written Opinion in International Patent Application No. PCT/US2015/011154 dated Apr. 24, 2015.
Orlov PI, Basics design, book 3, Moscow, Mashinostroenie p. 219 fig.408 (1977).

* cited by examiner

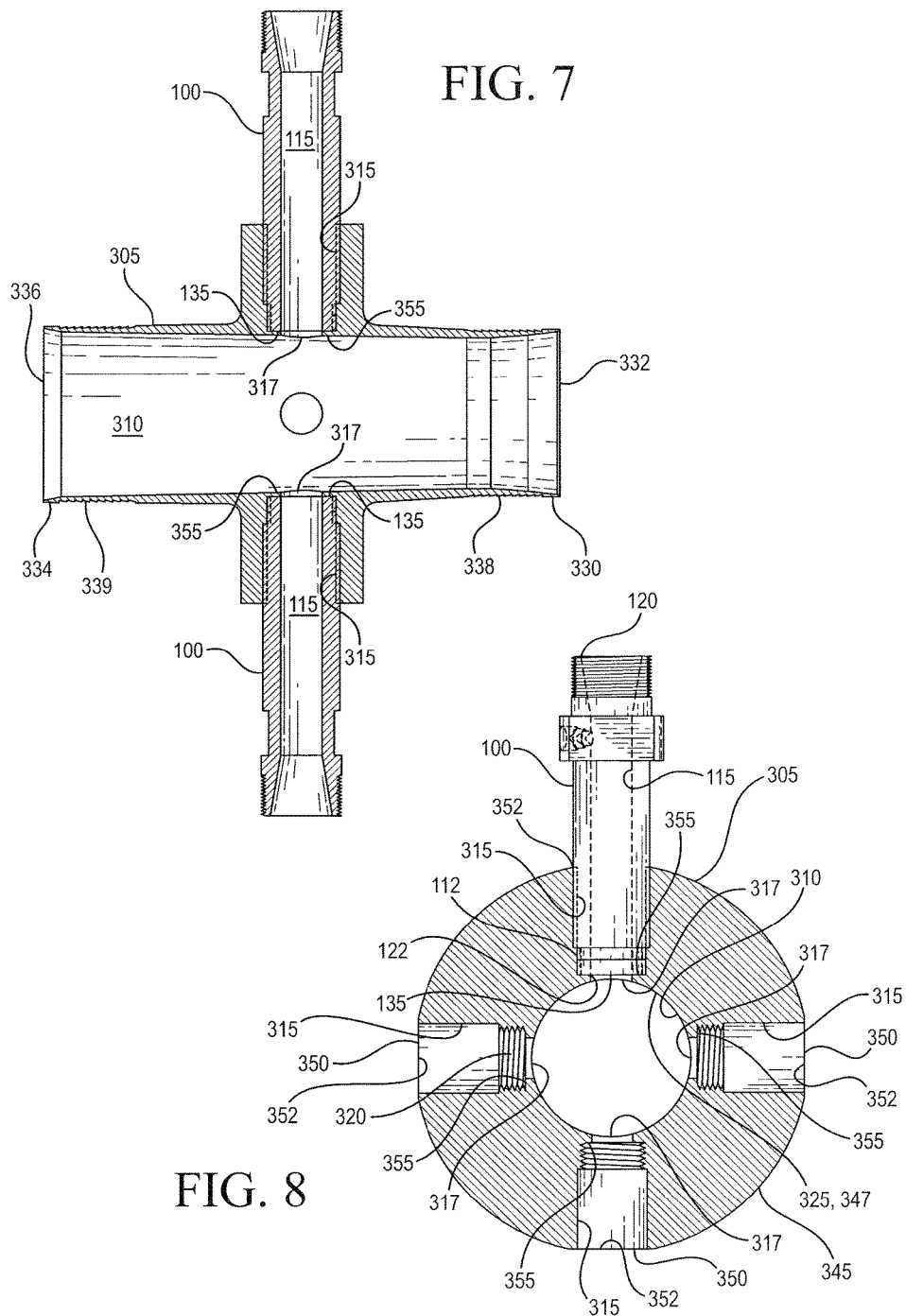

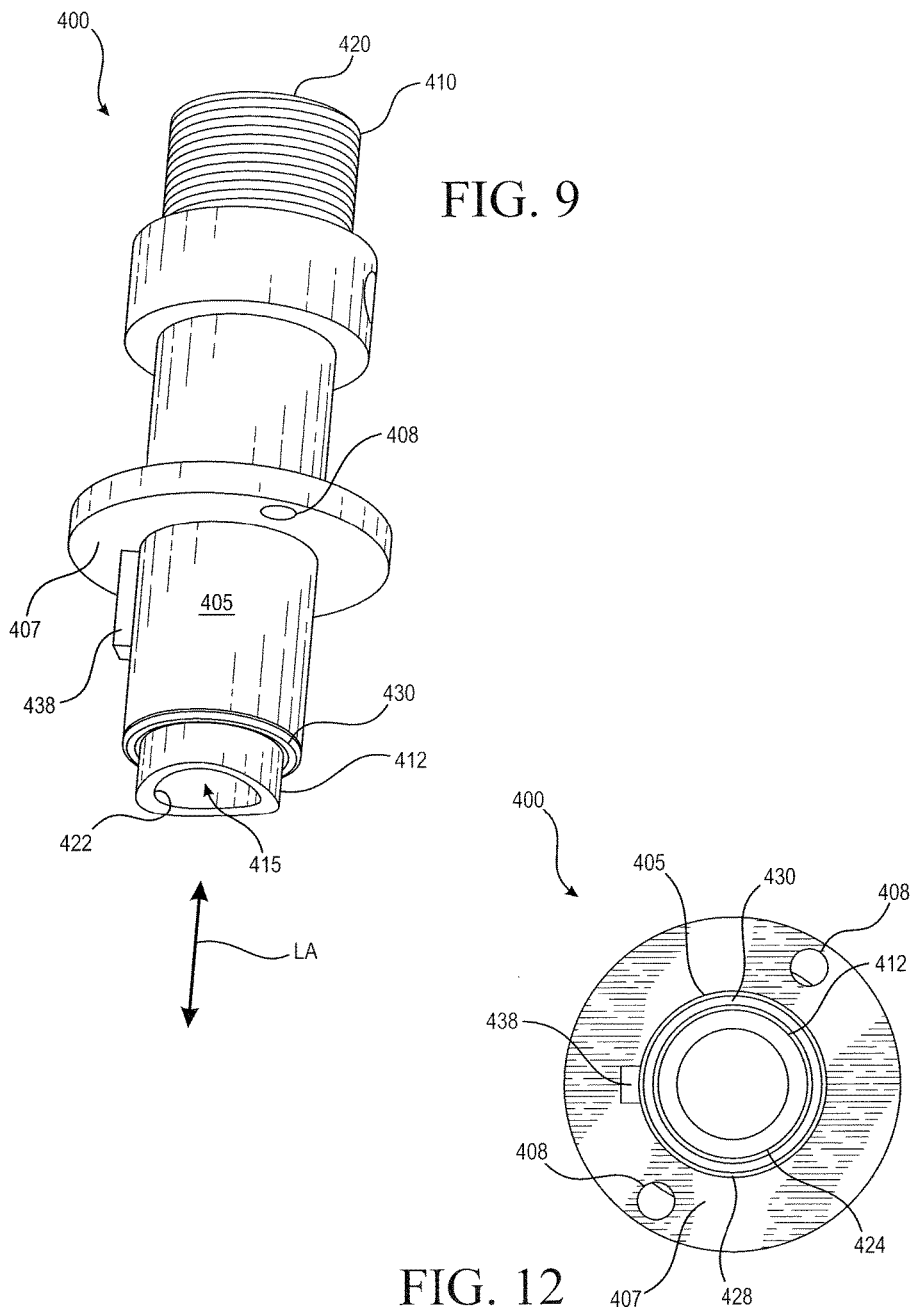

FOAM INJECTION SYSTEM WITH VARIABLE PORT INSERTS FOR SLURRY MIXING AND DISPENSING APPARATUS

CROSS-REFERENCE TO RELATED APPLICATION

This patent application claims the benefit of priority to U.S. Provisional Patent Application No. 61/927,881, filed Jan. 15, 2014, and entitled, "Foam Injection System With Variable Port Inserts for Slurry Mixing and Dispensing Apparatus," which is incorporated in its entirety herein by this reference.

BACKGROUND

The present disclosure relates to continuous board manufacturing processes and, more particularly, to a system and method for the introduction of aqueous foam into a cementitious slurry in connection with the manufacture of a cementitious article.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677. Also, many specialty materials, such as materials useful for modeling and mold-making that are precisely machined, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, aqueous foam, and other components, as appropriate to form foamed cementitious slurry. In the manufacture of cementitious articles, the cementitious slurry and desired additives are often blended in a continuous mixer, as for example described in U.S. Pat. No. 3,359,146.

For example, in a typical manufacturing process, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. The stream of foamed slurry passes through the discharge conduit from which it is continuously deposited onto a moving web of cover sheet material supported by a forming table.

The foamed slurry is allowed to spread over the advancing web. A second web of cover sheet material is applied to cover the foamed slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam.

Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated by reference.

In conventional arrangements, aqueous foam is injected into the cementitious slurry through a foam block or body having one or more fixed ports with a specifically-sized orifice. If it is desired to vary the size of the orifice (e.g., to change the pressure of the foam flowing through the foam port), the entire foam block must be removed and replaced with a different foam block with a port or ports having an orifice with a different size. This approach can be costly and can consume a fairly large amount of time to accomplish.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a foam injection system for use in preparing a cementitious product. In embodiments, a foam injection system can be a part of a cementitious slurry mixing and dispensing assembly and used to inject foam into a flow of cementitious slurry produced in the assembly.

In one embodiment, a foam injection system includes a foam injection body, a first port insert, and a second port insert. The foam injection body defines a slurry passageway and a port passageway. The port passageway has a port opening in fluid communication with the slurry passageway. The first port insert defines a first foam passageway having a first orifice with a first orifice size. The first port insert is adapted to removably mount to the foam injection body such that the first foam passageway is in fluid communication with the slurry passageway via the port opening of the port passageway. The second port insert defines a second foam passageway having a second orifice with a second orifice size. The second port insert is also adapted to removably mount to the foam injection body such that the second foam passageway is in fluid communication with the slurry passageway via the port opening of the port passageway. The second orifice size is different than the first orifice size.

In another aspect of the present disclosure, embodiments of a slurry mixing and dispensing assembly are described. In one embodiment, a slurry mixing and dispensing assembly includes a mixer, a slurry discharge conduit, and a foam injection system.

The mixer is adapted to agitate water and a cementitious material to form aqueous cementitious slurry. The slurry discharge conduit is in fluid communication with the mixer.

The foam injection system is arranged with at least one of the mixer and the slurry discharge conduit. The foam injection system includes a foam injection body, a first port insert, and a second port insert.

The foam injection body comprises a part of at least one of the mixer and the slurry discharge conduit. The foam injection body defines a slurry passageway and a port passageway. The slurry passageway is configured to convey cementitious slurry therethrough. The port passageway has a port opening in fluid communication with the slurry passageway.

The first port insert defines a first foam passageway having a first orifice with a first orifice size. The first port insert is adapted to removably mount to the foam injection body such that the first foam passageway is in fluid communication with the slurry passageway via the port opening of the port passageway.

The second port insert defines a second foam passageway having a second orifice with a second orifice size. The second port insert is adapted to removably mount to the foam injection body such that the second foam passageway is in fluid communication with the slurry passageway via the port opening of the port passageway. The second orifice size is different than the first orifice size.

In another aspect of the present disclosure, embodiments of a method of preparing a cementitious product are described. In one embodiment of a method of preparing a cementitious product, a flow of aqueous foam is conveyed to a first foam passageway of a first port insert, which is removably mounted to a foam injection body. The foam injection body defines a slurry passageway and a port passageway. The port passageway has a port opening in fluid communication with the slurry passageway. The first port insert is removably mounted to the foam injection body such that the first foam passageway is in fluid communication with the slurry passageway via the port opening of the port passageway. The flow of aqueous foam in the first foam passageway of the first port insert is injected under a first flow condition into a flow of aqueous cementitious slurry passing through the slurry passageway to form a flow of foamed cementitious slurry.

Further and alternative aspects and features of the disclosed principles will be appreciated from the following detailed description and the accompanying drawings. As will be appreciated, the foam injection systems and techniques disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 7 is a longitudinal cross-sectional view of the foam injection body of FIG. 6, illustrating foam port inserts similar in construction to the foam port of FIG. 1 removably mounted thereto.

FIG. 8 is a transverse cross-sectional view of the foam injection body of FIG. 6, illustrating the foam port insert of FIG. 1 removably mounted thereto.

FIG. 9 is a perspective view of another embodiment of a foam port insert constructed in accordance with principles of the present disclosure.

FIG. 12 is a mounting end plan view of the foam port of insert of FIG. 9.

DETAILED DESCRIPTION OF EXEMPLARY EMBODIMENTS

Figure 1:
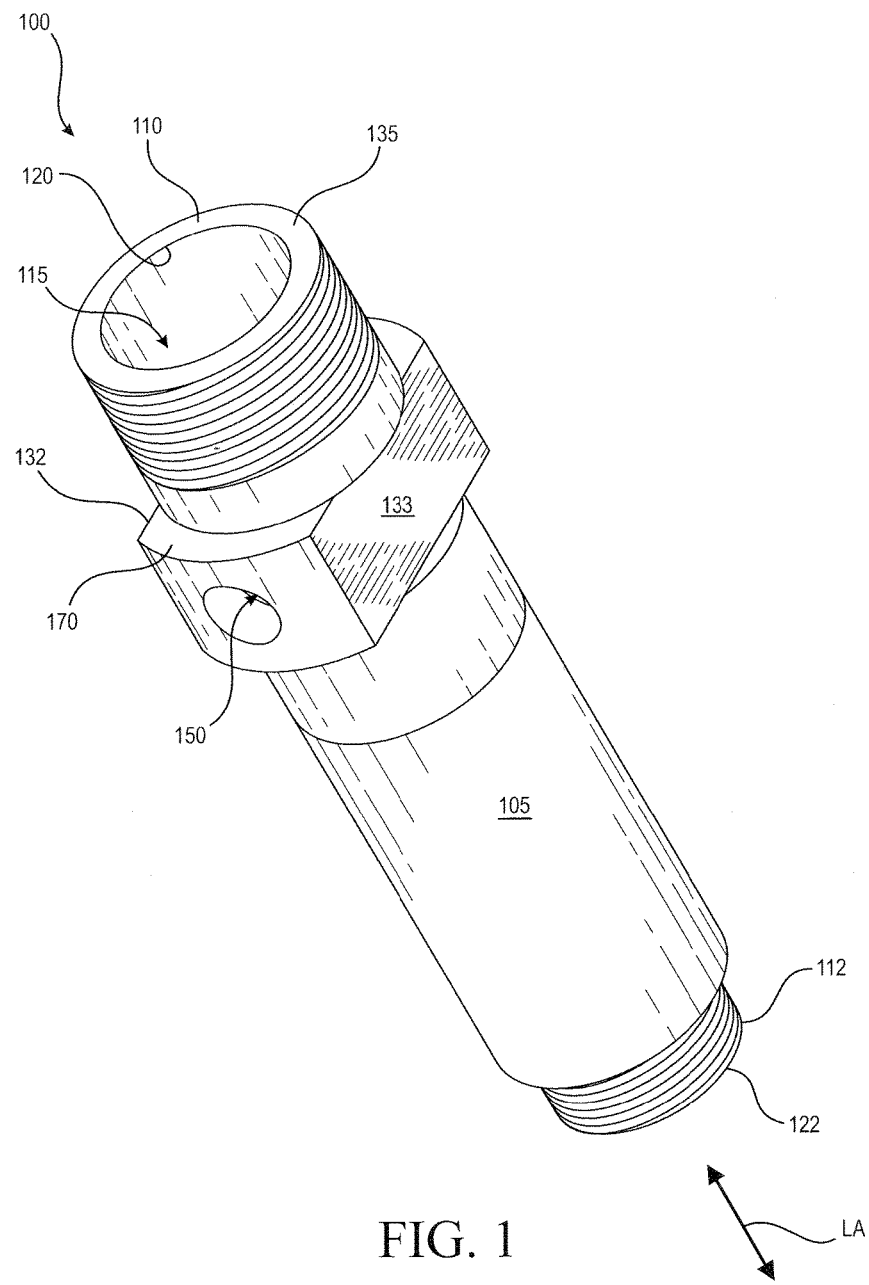
FIG. 1 is a perspective view of an embodiment of a foam port insert suitable for use in an embodiment of a foam injection system of a cementitious slurry mixing and dispensing assembly constructed in accordance with principles of the present disclosure.

The present disclosure provides various embodiments of a cementitious slurry mixing and dispensing assembly that can be used in the manufacture of cementitious products such as gypsum wallboard, for example. Embodiments of a cementitious slurry mixing and dispensing assembly constructed in accordance with principles of the present disclosure can include a foam injection system adapted to inject foam into the cementitious slurry via replaceable injection port inserts with different foam passageways (e.g., with different port orifice sizes) to readily vary a flow condition of the flow of aqueous foam therethrough, such as, to vary the foam injection pressure to achieve a desired flow condition, for example.

A cementitious slurry mixing and dispensing assembly according to principles of the present disclosure can be used to form any type of cementitious product. In embodiments, a cementitious board, such as, a gypsum wallboard, an acoustical panel, or a portland cement board, for example, can be formed.

Embodiments of a cementitious slurry mixing and dispensing assembly constructed in accordance with principles of the present disclosure can be used to mix and distribute a cementitious slurry (e.g., an aqueous calcined gypsum slurry) onto an advancing web (e.g., paper or mat) moving on a conveyor during a continuous board (e.g., gypsum wallboard) manufacturing process. In one aspect, a foam injection system constructed in accordance with principles of the present disclosure can be used in a conventional gypsum drywall manufacturing process and arranged with at least one of a mixer, which is adapted to agitate calcined gypsum and water to form an aqueous calcined gypsum slurry, and a slurry discharge conduit, which is attached to, and in fluid communication with, the mixer.

The cementitious slurry can be any conventional cementitious slurry, for example any cementitious slurry, such as those commonly used to produce gypsum wallboard, acoustical panels including, for example, acoustical panels described in U.S. Patent Application Publication No. 2004/0231916, or portland cement board, for example. As such, the cementitious slurry can optionally further comprise any other additives in addition to foam that are commonly used in the production of cementitious products. Such additives include structural additives including mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, hydrophobic agent, such as a silicone-based material (e.g., a silane, siloxane, or silicone-resin matrix), and the like. Examples of the use of some of these and other additives are described, for instance, in U.S. Pat. Nos. 6,342,284; 6,632,550; 6,800,131; 5,643,510; 5,714,001; and 6,774,146; and U.S. Patent Application Publication Nos. 2002/0045074; 2004/0231916; 2005/0019618; 2006/0035112; and 2007/0022913.

Non-limiting examples of cementitious materials include portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrate, calcium sulfate dihydrate ("gypsum," "set gypsum," or "hydrated gypsum"), and mixtures thereof. In one aspect, the cementitious material desirably comprises calcined gypsum (sometimes referred to as, "stucco"), such as in the form of calcium sulfate alpha hemihydrate, calcium sulfate beta hemihydrate, and/or calcium sulfate anhydrite. The calcined gypsum can be fibrous in some embodiments and nonfibrous in other embodiments. In embodiments, the calcined gypsum can include at least about 50% beta calcium sulfate hemihydrate. In other embodiments, the calcined gypsum can include at least about 86% beta calcium sulfate hemihydrate. The weight ratio of water to calcined gypsum can be any suitable ratio, although, as one of ordinary skill in the art will appreciate, lower ratios can be more efficient because less excess water will remain after the hydration process of the stucco is completed to be driven off during manufacture, thereby conserving energy. In some embodiments, the cementitious slurry can be prepared by combining water and calcined gypsum in a suitable water to stucco weight ratio for board production depending on products, such as in a range between about 1:6 and about 1:1, e.g., about 2:3.

In embodiments, a foam injection system constructed in accordance with principles of the present disclosure includes a foam injection body, at least one of a first type of foam insert port, and at least one of a second type of foam insert port. Embodiments of a foam injection system constructed in accordance with principles of the present disclosure can advantageously be configured as a retrofit component of a cementitious slurry mixing and dispensing assembly, such as one in an existing wallboard manufacturing system, for example.

In embodiments, the foam injection body defines a slurry passageway through which cementitious slurry can pass and at least one foam port passageway, each of which being in fluid communication with the slurry passageway. In embodiments, the foam injection body can comprise any suitable part of a mixer and/or a discharge conduit attached to the mixer. In embodiments, the foam injection body can comprise at least a part of the mixing chamber of the mixer itself (e.g., wherein the mixer lid defines at least one foam port passageway). In embodiments, the foam injection body can comprise a component of a discharge conduit referred to as a "gate," which is mounted to a mixer outlet and includes one or more foam port passageways. In other embodiments, the foam injection body can comprise a component of a discharge conduit referred to as a "foam ring," which includes one or more foam port passageways. In embodiments, the foam ring has a number of foam port passageways (e.g., three or four) in substantially evenly spaced relationship to each other around the circumference of the foam ring.

The foam injection system can include a number of the first type of the foam port inserts that corresponds to the number of foam port passageways in the foam injection body, and a similar number of the second type of the foam port inserts. In embodiments, each of the first type of foam port insert can define a foam passageway having an orifice with a first size. Each of the second type of foam port insert can define a foam passageway having an orifice with a second size, which is different that the first type. The first type of foam port inserts can be removably mounted to the foam injection body such that each of the first type of foam port inserts is in fluid communication with the slurry passage of the foam injection body via a respective one of the foam port passageways.

Each of the first type of foam port insert can be removed from the respective foam port passageway of the foam injection body within which it is removably mounted and replaced with a respective one of the second type of foam port inserts to vary the flow of aqueous foam into the slurry passage. The first and second types of foam port inserts can be similar in construction, but with different foam passageways (e.g., different orifice sizes) to produce a different flow of aqueous foam therethrough with at least one different flow condition (e.g., pressure). In embodiments, the first and second types of foam port inserts have similar mounting features for removably mounting the foam port inserts to the foam injection body. In embodiments of a foam injection body having multiple foam port passageways, at least two different types of foam port inserts can be removably mounted within different port passageways of the foam injection body at a given time.

Turning now to the Figures, an embodiment of a first type of a foam port insert 100 constructed according to principles of the present disclosure is shown in FIGS. 1-4. The foam port insert 100 is suitable for use in embodiments of a foam injection system following principles of the present disclosure. The foam port insert 100 can be adapted to receive a flow of aqueous foam from a foam supply conduit in fluid communication with a supply of aqueous foam, such as from a foam generator, for example, and inject the foam into a cementitious slurry passing through a slurry passageway 310 of a compatible foam injection body 305 of a foam injection system to which the foam port insert 100 is removably mounted (see FIG. 6).

The foam port insert 100 can be made from any suitable material, such as a suitable metal or any other suitable material which can be used to convey aqueous foam therethrough at a pressure suitable for injecting the foam into cementitious slurry during the manufacture of a cementitious product, using any suitable technique. In embodiments, the foam port insert 100 can be made from a suitable metal, such as, aluminum, stainless steel, brass, etc. In embodiments, at least a portion of the foam port insert 100 can be plated with a suitable material (e.g., chrome) to increase its durability.

Referring to FIG. 1, the foam port insert 100 includes a port insert body 105 extending along a longitudinal axis LA between a foam supply end 110 and a mounting end 112. The port insert body 105 is generally in the form of a hollow cylinder such that the foam port insert 100 defines a foam passageway 115 therethrough. The foam supply end 110 defines a foam inlet opening 120, and the mounting end 112 defines a foam outlet opening 122 (see FIG. 4 also). The foam passageway 115 extends between, and is in fluid communication with, the foam inlet opening 120 and the foam outlet opening 122.

The foam port insert 100 is adapted to removably mount to a mating foam injection body 305 such that the foam passageway 115 is in fluid communication with the slurry passageway 310 of the foam injection body 305 through a port passageway 315 defined in the foam injection body 305 (see FIG. 8) and in fluid communication with the slurry passageway 310 via a port opening 317. The foam port insert 100 is adapted to receive a flow of aqueous foam entering the foam inlet opening 120 and inject the flow of aqueous foam into a flow of cementitious slurry passing through the slurry passage 310 of the foam injection body 305 to which the foam port insert 100 is removably mounted by discharging the flow of aqueous foam out of the foam outlet opening 122.

Figure 2:
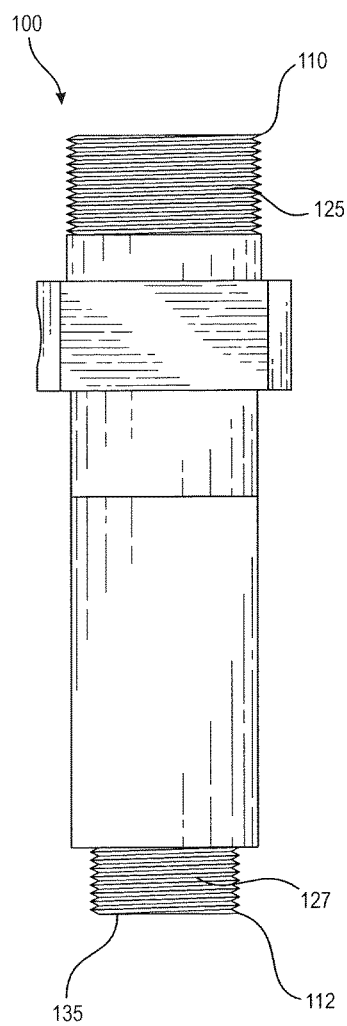
FIG. 2 is a side elevational view of the foam port insert of FIG. 1.

Referring to FIG. 2, the foam supply end 110 is adapted for retentive engagement with a suitable foam supply conduit. The illustrated foam supply end 110 includes an external threaded surface 125 which is adapted to sealingly engage a mating internal threaded surface of a suitable coupling of a foam supply conduit.

In other embodiments, the foam supply end 110 can include another suitable mounting structure for retentive coupling with a foam supply conduit. For example, in other embodiments, the foam supply end 110 can include an external barbed surface which can promote a friction fit between the external barbed surface and an internal surface of a suitably-sized foam supply conduit. An adjustable hose clamp can be fitted to the exterior surface of the foam supply conduit, placed in overlapping relationship with the portion of the foam supply end 110 disposed within the foam supply conduit, and tightened to further promote the retentive engagement of the foam supply conduit to the foam supply end 110 of the foam port insert 100.

In embodiments, the mounting end 112 of the foam port insert 100 can include structure suitable for removably mounting the foam port insert 100 to a mating foam injection body 305. In embodiments, at least a portion of the mounting end 112 of the foam port insert 100 can be disposed in a port passageway 315 of the foam injection body 305 when the foam port insert 100 is removably mounted thereto (see FIG. 8). Referring back to FIG. 2, the mounting end 112 of the illustrated foam port insert 100 includes a threaded surface 127 adapted to retentively engage a mating threaded surface 320 of the foam injection body 305, which can be associated with the port passageway 315 (see FIG. 8). In embodiments, the mating threaded surface 320 of the foam injection body 305 can be an internal threaded surface in each port passageway 315 of the foam injection body 305.

Figure 3:
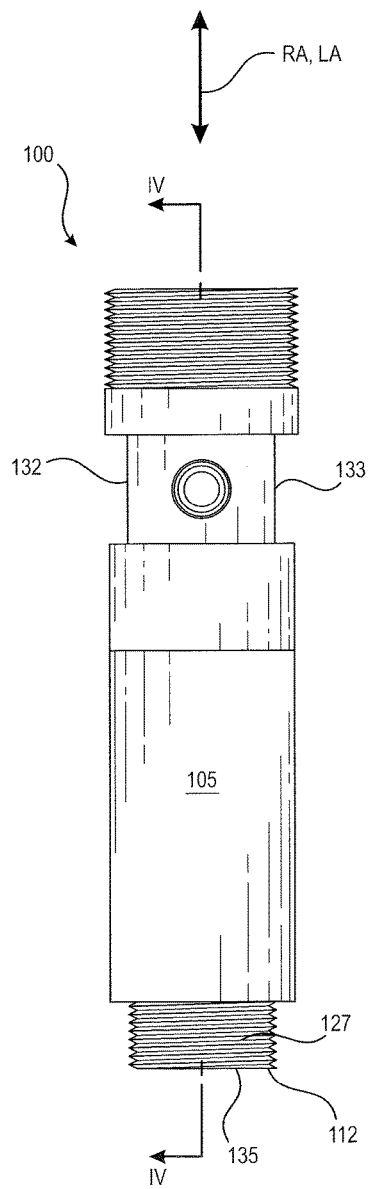
FIG. 3 is a front elevational view of the foam port insert of FIG. 1.

Referring to FIGS. 1 and 3, to facilitate the mounting and removal of the foam port insert 100 from a mating foam injection body 305, the foam port insert 100 can include a pair of flats 132, 133, or planar surfaces, disposed in spaced, substantially parallel relationship to each other. The planar surfaces 132, 133 can be configured so that the jaws of a wrench can respectively grip the planar surfaces 132, 133, and the operator can use the wrench to help rotate the foam port insert 100 either into or out of threaded engagement with the foam injection body 305. In embodiments, the flats 132, 133 can be provided by machining an external cylindrical surface of the port insert body 105.

Referring to FIG. 3, the threaded surface 127 of the mounting end 112 defines an axis of rotation RA about which the foam port insert 100 rotates to threadingly engage and disengage the mating threaded surface 320 of the foam injection body 305. The illustrated axis of rotation RA substantially coincides with the longitudinal axis LA of the foam port insert 100. The illustrated planar surfaces 132, 133 are substantially parallel to each other and to the axis of rotation RA.

Referring to FIGS. 1-4, the mounting end 112 of the foam port insert 100 has a distal end face 135. The illustrated distal end face 135 is substantially planar. Referring to FIG. 8, the foam port insert 100 can be adapted to be removably mounted to a mating foam injection body 305 such that the mounting end 112 of the foam port insert 100 is disposed within the port passageway 315 and the distal end face 135 of the foam port insert 100 is adjacent an inner surface 325 of the foam injection body 305 which defines the slurry passageway 310.

Figure 4:
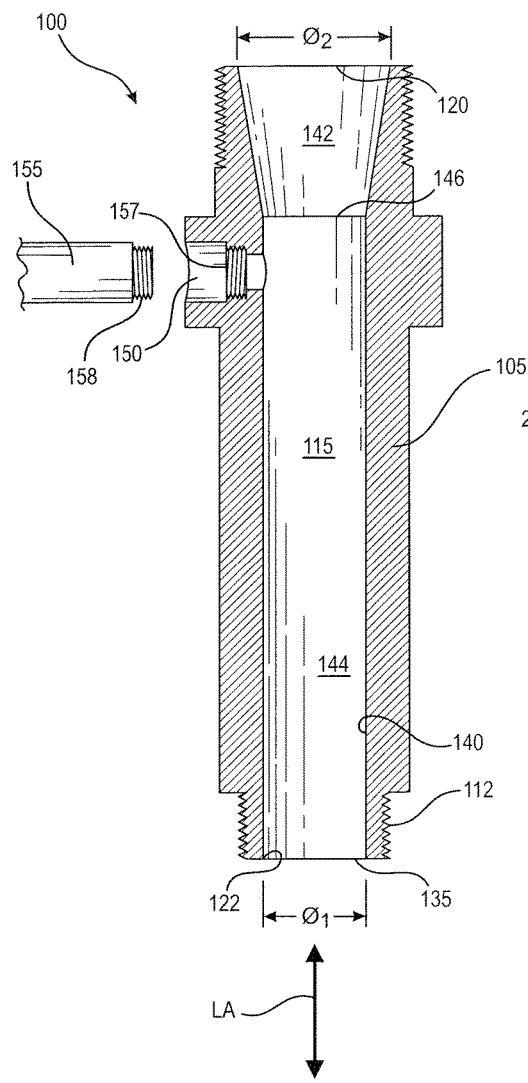
FIG. 4 is a cross-sectional view of the foam port insert of FIG. 1 taken along line IV-VI in FIG. 3 and a fragmentary side view of an exemplary pressure sensor suitable for use with the foam port insert.

Referring to FIG. 4, the illustrated foam passageway 115 of the foam port insert 100 is generally cylindrical and has a substantially circular cross-sectional shape in a plane perpendicular to the longitudinal axis LA along the length thereof. The foam passageway 115 of the foam port insert 100 has a first orifice 140 with a first orifice size $\varnothing_1$. The orifice size $\varnothing_1$ of the foam passageway 115 can be measured as the cross-sectional area of the foam passageway 115 in a plane substantially perpendicular to the direction of flow through the foam passageway 115, in this case in a plane substantially perpendicular to the longitudinal axis LA. In embodiments where the size of the cross-sectional area of the foam passageway 115 in a plane substantially perpendicular to the direction of flow varies along the longitudinal length of the foam passageway 115, the orifice size $Ø_1$ can be measured as the nominal smallest value found within the foam passageway 115. In embodiments, where the foam passageway 115 is cylindrical, the orifice size $Ø_1$ can be expressed as an inner diameter of the port insert body 105. The illustrated first orifice size $Ø_1$ is nominally ¼ of an inch.

To facilitate the compatibility of different types of foam port inserts 100, 200 with the same foam supply conduit and the same mating foam injection body 305, the first foam passageway 115 can include a tapered entry portion 142 and a main portion 144. The tapered entry portion 142 can include the foam inlet opening 120 and an entry outlet opening 146 in fluid communication with the main portion 144 of the foam passageway 115. The entry portion 142 can provide a variable transition area in which the flow of aqueous foam moves from the supply conduit with a particular cross-sectional to the main portion 144 of the foam passageway 115, which includes the first orifice 140 with an orifice size $Ø_1$ that is different that the size of the supply conduit. In embodiments, the entry portion 142 can be configured to facilitate the transition of the flow of aqueous foam from the supply conduit to the foam port insert 100 to help reduce the destruction of the aqueous foam.

The illustrated entry portion 142 is generally frusto-conical in longitudinal cross-section. In other embodiments, the entry portion 142 can have a different shape adapted to transition the flow of aqueous foam from the supply conduit with a supply outlet opening having a particular cross-sectional area to the main portion 144 of the foam passage 115 which has a cross-sectional area corresponding to the first orifice size $Ø_1$ that is different than the cross-sectional area of the supply outlet opening of the foam supply conduit. The illustrated foam inlet opening 120 has a size $Ø_2$ that is larger than the first orifice size $Ø_1$. The illustrated entry outlet opening 146 is smaller than the size $Ø_2$ of the foam inlet opening 120 and corresponds to the first orifice size $Ø_1$ such that the entry portion 142 narrows from the foam inlet opening 120 to the entry outlet opening 146. The illustrated main portion 144 extends between the entry outlet opening 146 and the foam outlet opening 122 and has a cross-sectional size corresponding to the first orifice size $Ø_1$. The illustrated main portion 144 has a substantially uniform cross-sectional area along its length over the longitudinal axis LA.

The foam port insert 100 can define a pressure sensor passageway 150 which is in fluid communication with the foam passageway 115. The pressure sensor passageway 150 can be configured to receive therein a pressure sensor 155 which is adapted to detect the pressure of a flow of aqueous foam passing through the foam passageway 115.

The pressure sensor passageway 150 can be adapted such that a compatible pressure sensor 155 disposed in the pressure sensor passageway 150 is sealingly mounted to the foam port insert 100. A pressure sensor 155 can be sealingly mounted to the foam port insert 100 and used to detect the pressure of a flow of aqueous foam passing through the foam passageway 115. The illustrated pressure sensor passageway 150 includes an internal threaded surface 157 which is configured to sealingly mate with an external threaded surface 158 of a compatible pressure sensor 155.

The illustrated foam port insert 100 defines a pressure sensor passageway 150 in fluid communication with the main portion 144 of the foam passageway 115. By providing a path to the foam passageway 115 of the foam port insert 100 itself, more accurate pressure readings can be obtained through the pressure sensor passageway 150. In embodiments, the pressure sensor 155 can provide substantially continuous pressure readings to a suitable controller. The controller can be adapted to monitor the pressure of the flow of aqueous foam through the foam passageway 115 and injected into the slurry passageway of the foam injection body 305 during operation. In embodiments, the controller can be adapted to make process changes to the supply of aqueous foam to vary a flow condition of the aqueous foam through the foam passageway 115 in response to a pressure signal transmitted to the controller by the pressure sensor 155.

Referring to FIG. 1, the illustrated port insert body 105 of the foam port insert 100 includes a shoulder portion 170 extending therefrom. The pressure sensor passageway 150 is defined in the shoulder portion 170 of the port insert body 105. The shoulder portion 170 can be included to provide adequate surrounding structure to define the pressure sensor passageway 150 and to facilitate the manufacture of the foam port insert 100. For example, the shoulder portion can be machined (e.g., drilled and tapped) to define the pressure sensor passageway. In the illustrated embodiment, the flats 132, 133 are machined in the shoulder portion 170 of the port insert body 105.

Figure 5:
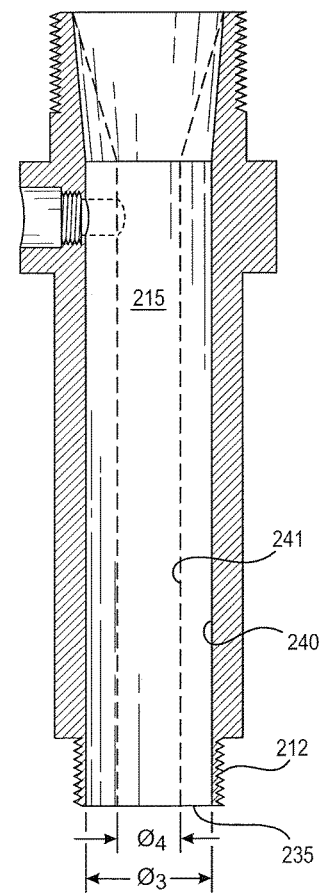
FIG. 5 is a view as in FIG. 4 of another embodiment of a foam port insert constructed in accordance with principles of the present disclosure which is similar in construction to the foam port insert of FIG. 1 but with a different foam passageway having a different orifice size.

Referring to FIG. 5, an embodiment of a second type of a foam port insert 200 constructed in accordance with principles of the present disclosure is shown. The foam port insert 200 of FIG. 5 is similar in construction and function to the foam port insert 100 of FIG. 1 except that the foam port insert 200 defines a second foam passageway 215 having a second orifice 240 with a second orifice size $Ø_2$. In embodiments, the second orifice size $Ø_2$ can have any suitable nominal value, such as ⅞ of an inch, for example, which is different than the nominal value of the first orifice size $Ø_1$, such as ¾ of an inch, for example. The illustrated second orifice size $Ø_2$ is larger than the illustrated first orifice size $Ø_1$.

In other embodiments, the second type of foam port insert 200 can have a different orifice size, such as one with an inner diameter anywhere between the inner diameter of the second orifice 240 and the inner diameter $Ø_4$ indicated in hidden lines 241 in FIG. 5, for example. In embodiments, the orifice sizes $Ø_1$, $Ø_3$, $Ø_4$ of the different types of foam port inserts can be different.

The second port insert 200 is adapted to removably mount to the foam injection body 305 in the same way as the first type of foam port insert 100 such that the second foam passageway 215 is in fluid communication with the slurry passageway 310 via a port opening 317 of the port passageway 315 with which it is associated. In embodiments of a foam injection system according to principles of the present disclosure, first and second types of foam port inserts 100, 200 can be provided which are similar in construction, including mounting structure, but with different orifice sizes $Ø_1$, $Ø_3$, $Ø_4$. Each type of foam port insert 100, 200 can be removably mounted to the same compatible foam injection body 305 so that the respective foam passageway 115, 215 is in fluid communication with the slurry passageway 310 of the foam injection body 305 via a port opening 317 of the port passageway 315. The particular foam port insert 100, 200 mounted to the foam injection body 305 can be removed and replaced with the other type of foam port insert 100, 200 to modify the flow of aqueous foam into the slurry passage 310 of the mating foam injection body 305, such as to vary the foam injection pressure into the flow of cementitious slurry passing through the slurry passageway 310 of the foam injection body 305.

In embodiments, a foam injection system according to principles of the present disclosure can include different types of foam port insets 100, 200 which each has a different orifice size $\emptyset_1$, $\emptyset_2$, $\emptyset_3$, etc. with a different inner diameter (and, thus, different cross-sectional areas) for the foam passageway 115, 215. In use, different types of foam port inserts can be removably mounted to the compatible foam injection body 305 to vary the desired average flow velocity of the aqueous foam into the cementitious slurry passing through the slurry passage 310 of the foam injection body 305.

In embodiments, a foam injection system according to principles of the present disclosure can include more than two types of foam port inserts each with a foam passageway having a different shape and/or size configured to produce at least one variable flow characteristic through the use of the different types of foam port inserts. In embodiments, a foam injection system according to principles of the present disclosure can include a set of different types of foam port inserts which have foam passageways with different orifice sizes of a variable inner diameter over a predetermined range, such as a set of different types of foam port inserts having a variable orifice size between an inner diameter of ¼ of an inch and one inch, for example. In embodiments, the set of different types of foam port inserts can be incrementally sized over the range of orifice sizes, such as a set of different types of foam port inserts which have orifice sizes with an inner diameter increasingly sized from ¼ of an inch to one inch by an increment of ¹⁄₁₆ of an inch (i.e., ¼ of an inch, ⁵⁄₁₆ of an inch, ⅜ of an inch, ⁷⁄₁₆ of an inch, ½ of an inch, ⁹⁄₁₆ of an inch, ⅝ of an inch, ¹¹⁄₁₆ of an inch, ¼ of an inch, ¹³⁄₁₆ of an inch, ⅞ of an inch, ¹⁵⁄₁₆ of an inch, and one inch). In other embodiments, different increments and/or ranges of orifice sizes can be used.

Figure 6:
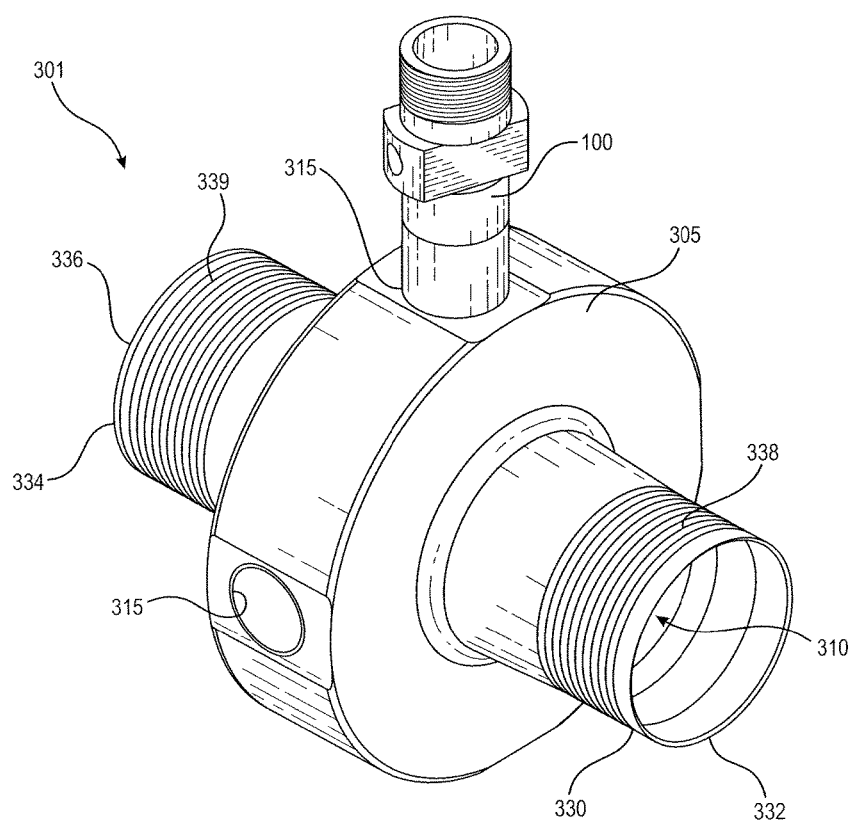
FIG. 6 is a perspective view of an embodiment of a foam injection body suitable for use in a foam injection system constructed in accordance with principles of the present disclosure, illustrating the foam port insert of FIG. 1 removably mounted thereto.

Referring to FIGS. 6-8, an embodiment of a foam injection body 305 constructed in accordance with principles of the present disclosure is disclosed. The foam injection body 305 can be made from any suitable material, such as a suitable metal or any other suitable material which can be used to convey cementitious slurry therethrough during the manufacture of a cementitious product, using any suitable technique. In embodiments, the foam injection body 305 can be made from a suitable metal, such as, aluminum, stainless steel, brass, etc. In embodiments, at least a portion of the foam injection body 305 can be plated with a suitable material (e.g., chrome) to increase its durability.

Referring to FIG. 6, the foam port insert 100 of FIG. 1 is removably mounted to the foam injection body 305. The foam injection body 305 of FIG. 6 is compatible with the first and second types of foam port inserts 100, 200 shown in FIGS. 1 and 5, respectively. The first and second types of foam port inserts 100, 200 shown in FIGS. 1 and 5, respectively, and the foam injection body 305 of FIG. 6 comprise an embodiment of a foam injection system 301 constructed in accordance with principles of the present disclosure. In embodiments, a suitable number of the first and second types of foam port inserts 100, 200 can be associated with the foam injection body 305 (see FIG. 7, e.g.). The first and second types of foam port inserts 100, 200 can be interchangeably used with the foam injection body 305 to inject aqueous foam into a flow of cementitious slurry passing through the foam injection body 305 under different flow conditions. In use, a set of foam port inserts including at least one different type of foam port insert from the other foam port inserts in the set can be removably mounted to the foam injection body 305 at a given time.

Referring to FIG. 6, in embodiments, the foam injection body 305 defines the slurry passageway 310 and at least one port passageway 315 in fluid communication with the slurry passageway. In embodiments, the foam injection body 305 defines at least two port passageways 315 in fluid communication with the slurry passageway 310. In embodiments, the foam injection system 301 can include a number of first and second foam port inserts 100, 200 each corresponding to the number of port passageways 315 in the foam injection body 305.

Referring to FIG. 8, the illustrated foam injection body 305 includes four port passageways 315 in fluid communication with the slurry passageway 310. Each of the illustrated port passageways 315 has a similar construction. Accordingly, it should be understood that the description of one port passageway 315 is equally applicable to each of the other port passageways 315, as well.

In embodiments, the slurry passageway 310 of the foam injection body 305 is adapted to receive a flow of cementitious slurry and convey it to a downstream part of the manufacturing system. In embodiments, the foam injection body 305 can comprise a portion of a mixer, which adapted to mix water and a cementitious material into aqueous cementitious slurry, or a part of a discharge conduit, which is in fluid communication with the mixer.

Referring to FIGS. 6 and 7, the illustrated foam injection body 305 comprises a part of a discharge conduit and includes a slurry inlet end 330 defining a slurry inlet opening 332 and a slurry discharge end 334 defining a slurry discharge opening 336. The slurry passageway 310 is in fluid communication with the slurry inlet opening 332 and the slurry discharge opening 336. In embodiments, the slurry inlet end 330 and the slurry discharge end 334 can be adapted to be secured to an upstream portion and a downstream portion, respectively, of a cementitious mixing and dispensing assembly.

The illustrated slurry inlet end 330 and slurry discharge end 334 of the foam injection body 305 each has an external barbed surface 338, 339 which is configured to promote a friction fit between the external barbed surface 338, 339 and an internal surface of a suitably-sized slurry conduit. An adjustable hose clamp can be fitted to the exterior surface of the slurry conduit, placed in overlapping relationship with the portion of the foam injection body 305 disposed within the slurry conduit, and tightened to further promote the retentive engagement of the slurry conduit to the foam injection body 305.

Referring to FIG. 7, in embodiments, the slurry inlet end 330 of the foam injection body 305 can be adapted to be placed in fluid communication with a slurry mixer and to receive a main flow of slurry therefrom. Aqueous foam can be injected into the main flow of slurry inside the slurry passage 310 via one or more foam port inserts 100, 200 which are removably mounted to the foam injection body 305 to form a foamed cementitious slurry. The foamed cementitious slurry can be discharged from the foam injection body 305 out the slurry discharge end 334. In embodiments, the slurry discharge end 334 of the foam injection body can be arranged with a delivery conduit of the discharge conduit which is adapted to convey the foamed cementitious slurry to at least one of a flow-modifying element and a suitable slurry distributor, such as one configured to discharge foamed slurry onto a moving web of cover sheet material. In the illustrated embodiment, the slurry discharge opening 336 is larger than the slurry inlet opening 332.

Referring to FIGS. 7 and 8, the inner surface 325 of the foam injection body 305 defines the slurry passageway 310. Each port passageway 315 has a port opening 317 in fluid communication with the slurry passageway 310. Each port passageway 315 is disposed in substantially perpendicular relationship to a direction of slurry flow through the slurry passage 310. In other embodiments, at least one port passageway 315 can have a different orientation with respect to the slurry passage 310 along at least one plane relative to the direction of slurry flow through the slurry passageway 310.

The illustrated foam injection body 305 comprises a foam ring having an outer circumferential surface 345 and an inner circumferential surface 347 in spaced radial relationship to the outer circumferential surface 345. In embodiments, the outer circumferential surface 345 can have a flat or planar surface 350 defined therein which circumscribes a port entry 352 defined in the outer circumferential surface 345. The inner circumferential surface 347 defines the slurry passageway 310. The port passageways 315 extend radially between the outer circumferential surface 345 and the inner circumferential surface 347. The illustrated port passageways 315 are substantially evenly spaced with respect to each other about the circumference of the foam ring 305 so that they are about ninety degrees apart from each other about the circumference.

Each type of the foam port inserts 100, 200 is adapted to removably mount to the foam injection body 305 such that the respective foam passageway 115, 215 is in fluid communication with the slurry passageway 310 via the port opening 317 of the port passageway 315 with which the foam port insert is associated. In the illustrated embodiment, each port passageway 315 is configured to receive the mounting end 112 of either the first type of the second type of foam insert therein. Each port passageway includes an internal threaded surface adapted to sealingly engage the mating threaded surface of the either the first type or the second type of the foam port inserts 100, 200 disposed at the mounting end thereof.

In embodiments, each type of foam port inserts 100, 200 is adapted to removably mount to the compatible foam injection body 305 such that the mounting end 112, 212 of the foam port insert 100, 200 is disposed within the port passageway 315 and the distal end face 135, 235 of the foam port insert 100, 200 is adjacent the inner surface 325 of the foam injection body 305. In embodiments, each one of the different types of foam port inserts 100, 200 is adapted to be removably mounted to any one of the port passageways 315 of the foam injection body 305.

Referring to FIGS. 7 and 8, the first type of foam port inserts 100 can be threaded into the associated port passageway 315 until the distal end face 135 of the foam port insert 100 contacts a bottom port wall 355 of the foam injection body 305 within the associated port passageway 315. The illustrated bottom port wall 355 defines the port opening 317 of the port passageway. The second type of foam port insert 200 can have a similar construction.

In embodiments, the geometry of the slurry passage 310 within the foam injection body 305 is not compromised or disrupted when the different types of foam port inserts 100, 200 are mounted to the foam injection body 305. In embodiments, the foam port insert 100, 200 does not project into the slurry passage 310 when it is fully mounted to the foam injection body 305 so that the flow of cementitious slurry through the slurry passage 310 is not disrupted by a structural feature of the foam port insert 100, 200. In embodiments, when fully mounted to the foam injection body 305, as shown in FIG. 7, e.g., the foam port insert 100 does not leave an "empty" area between it and the foam injection body 305 where slurry could be trapped and build up. This build up can lead to operational issues and eventually force the board line to shut down to clean out the foam injection body 305.

Referring to FIGS. 9-13, another embodiment of a first type of a foam port insert 400 constructed in accordance with principles of the present disclosure is shown. The foam port insert 400 is suitable for use in embodiments of a foam injection system following principles of the present disclosure. The foam port insert 400 can be adapted to receive a flow of aqueous foam from a foam supply conduit in fluid communication with a supply of aqueous foam, such as from a foam generator, for example, and inject the foam into a cementitious slurry passing through a slurry passageway 610 of a foam injection body 605 of a foam injection system to which the foam port insert 400 is removably mounted (see FIG. 15).

Referring to FIG. 9, the foam port insert 400 includes a port insert body 405 extending along a longitudinal axis LA between a foam supply end 410 and a mounting end 412. The port insert body 405 is generally in the form of a hollow cylinder such that the foam port insert 400 defines a first foam passageway 415 therethrough. The foam supply end 410 defines a foam inlet opening 420 (see FIG. 13 also), and the mounting end 412 defines a foam outlet opening 422. The foam passageway 415 extends between, and is in fluid communication with, the foam inlet opening 420 and the foam outlet opening 422.

The foam port insert 400 is adapted to removably mount to a mating foam injection body 605 (see FIG. 16) such that the foam passageway 415 is in fluid communication with the slurry passageway 610 of the foam injection body 605 through a port passageway 615 defined in the foam injection body 605. The foam port insert 400 is adapted to receive a flow of aqueous foam entering the foam inlet opening and inject the flow of aqueous foam into a flow of cementitious slurry passing through a slurry passage of a foam injection body 605 to which the foam port insert 400 is removably mounted by discharging the flow of aqueous foam out of the foam outlet opening.

Referring to FIGS. 9 and 12, the illustrated foam port insert 400 includes a mounting flange 407 extending radially outwardly from the port insert body. The mounting flange 407 defines a pair of mounting holes 408, which are each configured to receive a fastener therethrough. In embodiments, the mounting flange 407 can define only one mounting hole 408 or more than two mounting holes 408. Each mounting hole 408 of the mounting flange 407 can be adapted to align with a mating mounting hole defined in the compatible foam injection body 605 so that one or more fasteners 409 can be used to removably mount the foam port insert 400 of FIG. 9 to the compatible foam injection body 605 (see, e.g., FIG. 16).

Referring to FIGS. 9-12, the foam port insert 400 of FIG. 9 is configured to removably mount to a compatible foam injection body 605 such that the mounting end 412 of the foam port insert 400 is disposed within a port passageway 615 defined in the foam injection body 605. The mounting end 412 of the illustrated foam port insert 400 includes a distal portion 424 having a reduced exterior diameter to define an intermediate shoulder 426 with a sealing face 428. An elastomeric o-ring 430 can be fitted around the distal portion 424 and placed against the sealing face 428. The sealing face 428 and the mounting flange 407 of the foam port insert 400 can be disposed with respect to each other such that the o-ring 430 can be compressed to become in sealing contact with the sealing face 428 and a counterbore sealing surface 616 of the foam injection body 605 when the mounting flange is in engaging contact with the portion of the foam injection body 605 to which it is mounted (see, e.g., FIG. 16).

Figure 10:
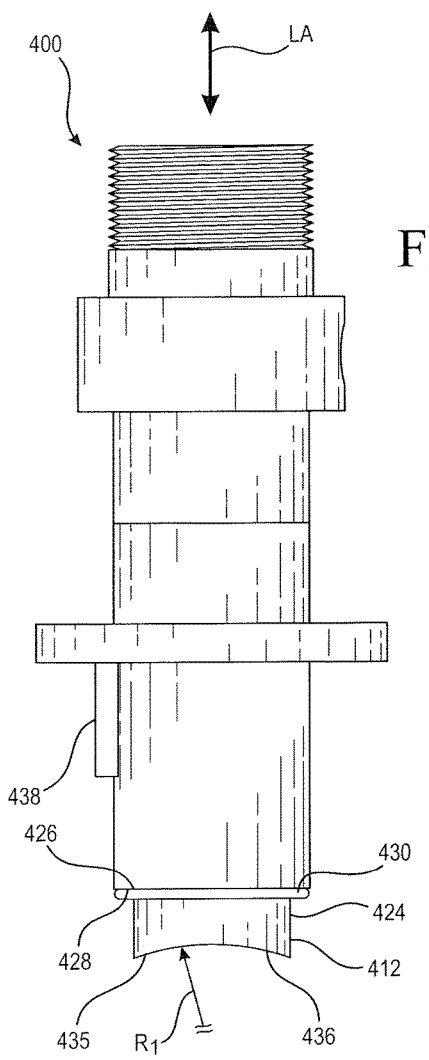
FIG. 10 is a side elevational view of the foam port insert of FIG. 9.
Figure 11:
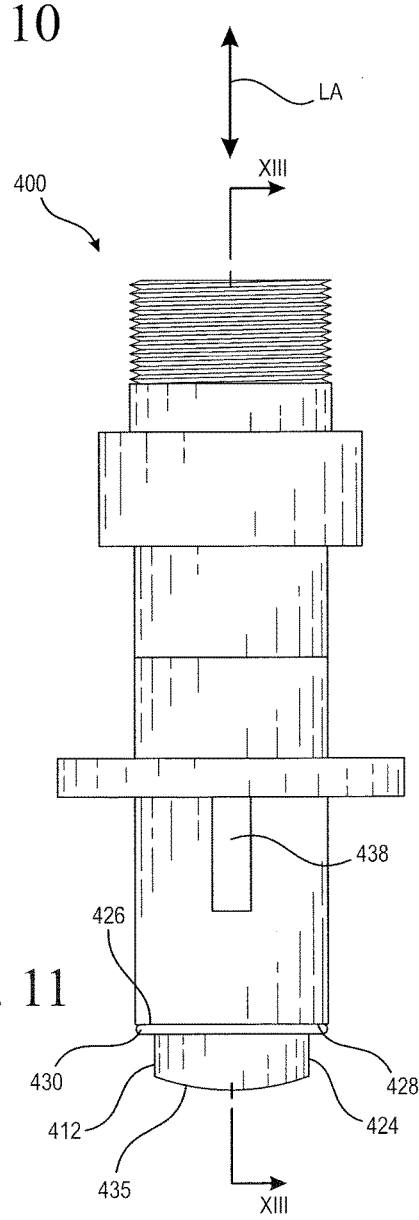
FIG. 11 is a rear elevational view of the foam port insert of FIG. 9.

Referring to FIG. 10, in embodiments, the foam port insert 400 can be adapted to include a flush-mounting feature wherein the mounting end 412 of the foam port insert 400 is substantially flush with the interior geometry of the slurry passage 610 of a compatible foam injection body 605. In the illustrated embodiment, the mounting end 412 of the foam port insert 400 has a distal end face 435 with a concave portion 436 with a radius of curvature $R_1$. The illustrated foam port insert 400 is adapted to removably mount to the foam injection body 605 such that the mounting end 412 of the foam port insert 400 is disposed within the port passageway 615 and the distal end face 435 of the foam port insert 400 is adjacent the inner surface 625 of the foam injection body 605 and the concave portion 436 of the distal end face 435 is substantially concentrically disposed with respect to a similarly-shaped concave portion 618 of the inner surface 625 of the foam injection body 605 (see FIG. 17) to define a substantially flush interface therebetween.

In embodiments, a foam port insert constructed following principles of the present disclosure can include an anti-rotation mechanism and an alignment mechanism. In embodiments, the same structure of the foam port insert can be configured to prevent the foam port insert from rotating relative to a mating foam injection body and to orient the foam port insert in at least one particular orientation with respect to the foam injection body.

Referring to FIGS. 9-12, the illustrated foam port insert 400 includes a rib 438 projecting from the port insert body 405 and extending along the longitudinal axis LA. The rib 438 can be provided to help prevent the foam port insert 400 from rotating about the longitudinal axis LA when mounted to the foam injection body 605 and to provide an alignment mechanism. The rib 438 can be configured to be complementary to a keyway 622 defined in the foam injection body 605 and associated with the port passageway 615 to retentively receive the rib therein (see FIG. 17, e.g.).

When the foam port insert 400 is mounted to the foam injection body 605, the foam port insert 400 is substantially constrained from rotating about the longitudinal axis LA relative to the foam injection body 605 by the interengagement of the rib 438 and the keyway 622. The rib 438-and-keyway 622 configuration can be adapted to align the distal end face 435 of the mounting end 412 of the foam port insert 400 with the concave area 618 of the inner surface 625 surrounding the port opening 615 of the foam injection body 605 (see FIG. 17) when the foam port insert 400 is mounted to the foam injection body 605 with the rib 438 disposed within the keyway 622 to provide a substantially continuous inner surface-foam injection port interface to help maintain the geometry of the slurry passageway 610.

In other embodiments, a foam port insert and a foam injection body constructed according to principles of the present disclosure can include different alignment and anti-rotation mechanisms. For example, in embodiments, the foam port insert can include a pair of alignment flats, or planar surfaces, disposed in spaced, substantially parallel relationship to each other. The alignment flats are disposed axially along the foam port insert between the flange and the mounting end of the foam port insert. The alignment flats can be configured to be complementary to a portion of the port passageway defined in the foam injection body to retentively receive the pair of alignment flats therein. For example, in embodiments, the outer circumferential surface of the foam injection body can define a groove or channel disposed in overlying relationship with the port entry such that the port passageway has a cross-section along the passageway that is generally T-shaped.

The alignment flats of the foam port inset are configured to retentively engage the groove in the foam injection body adjacent the port entry such that the foam port insert is constrained from rotating about its longitudinal axis LA relative to the foam injection body by the interengagement of the alignment flats and the groove. The alignment flats-and-groove configuration can be adapted to align the distal end face of the mounting end of the foam port insert with the concave area of the inner surface surrounding the port opening of the foam injection body when the foam port insert is mounted to the foam injection body with the alignment flats disposed within the groove of the foam injection body to provide a substantially continuous inner surface-foam injection port interface to help maintain the geometry of the slurry passageway defined by the foam injection body. In yet other embodiments, the foam port insert and/or the foam injection body can have an alignment mechanism and/or an anti-rotation mechanism with a different configuration.

Figure 13:
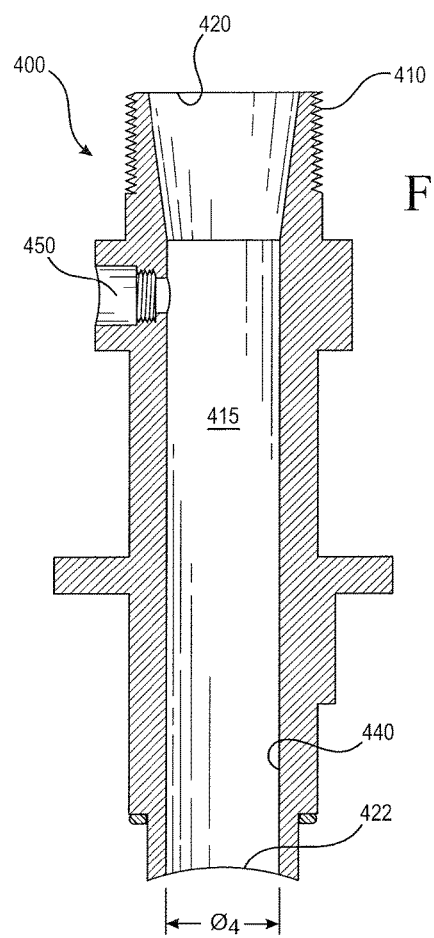
FIG. 13 is a cross-sectional view of the foam port insert of FIG. 9 taken along line XIII-XIII in FIG. 11.

Referring to FIG. 13, the construction and function of the foam port insert 400 of FIG. 9 is similar in other respects to the foam port insert 100 of FIG. 1. For example, the foam supply end 410 can be adapted for retentive engagement with a foam supply conduit in a similar manner as described above. The foam port insert 400 defines a pressure sensor passageway 450 in fluid communication with the first foam passageway 415 in a similar way as the foam port insert 100 of FIG. 1. Also, the foam passageway 415 of the foam port insert 400 of FIG. 9 can have a similar geometry to a foam passageway 115, 215 defined in embodiments of a foam port insert 100, 200 described above.

Figure 14:
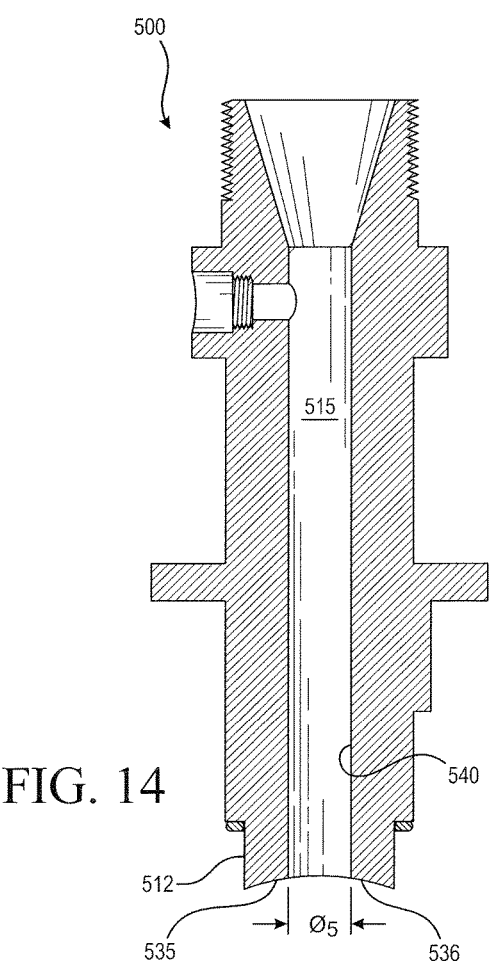
FIG. 14 is a view as in FIG. 13 of another embodiment of a foam port insert constructed in accordance with principles of the present disclosure which is similar in construction to the foam port insert of FIG. 9 but with a different foam passageway having a different orifice size.

Referring to FIG. 13, the first foam passageway 415 of the foam port insert 400 has a first orifice 440 with a first orifice size $Ø_4$. Referring to FIG. 14, an embodiment of a second type of a foam port insert 500 constructed in accordance with principles of the present disclosure is shown. The foam port insert 500 of FIG. 14 is similar in construction and function to the foam port insert 400 of FIG. 9 except that the foam port insert 500 defines a foam passageway 515 having a second orifice 540 with a second orifice size $Ø_5$ that is different than the first orifice size $Ø_4$ of the foam passageway 415 of the foam port insert 400 of FIG. 9 (see FIG. 13). In embodiments, the second orifice size $Ø_5$ can have any suitable nominal value, such as ⅜ of an inch, for example, which is different than the nominal value of the first orifice size $Ø_4$, such as ¼ of an inch, for example. In embodiments, the orifice sizes $Ø_4$, $Ø_5$ of the different types of foam port inserts 400, 500 can be different. In other embodiments, the second type of foam port insert 500 can have a different orifice size $Ø_5$, such as one with an inner diameter in a predetermined range, such as between about ¼ of an inch and one inch, for example.

The second port insert 500 of FIG. 14 is adapted to removably mount to the foam injection body 605 in the same way as the first type of foam port insert 400 of FIG. 9 such that the second foam passageway 515 is in fluid communication with the slurry passageway 610 via the port opening 617 of the port passageway 615. In embodiments of a foam injection system according to principles of the present disclosure, first and second types of foam port inserts 400, 500 can be provided which are similar in construction, including mounting structure, but with different orifice sizes $Ø_4$, $Ø_5$. In embodiments, one type of foam port insert 400, 500 mounted to the foam injection body 605 can be removed and replaced with another type of foam port insert 400, 500 to modify the flow of aqueous foam into the slurry passage 610 of the mating foam injection body 605, such as to vary the foam injection pressure into the flow of cementitious slurry passing through the slurry passageway 610 of the foam injection body 605.

Figure 15:
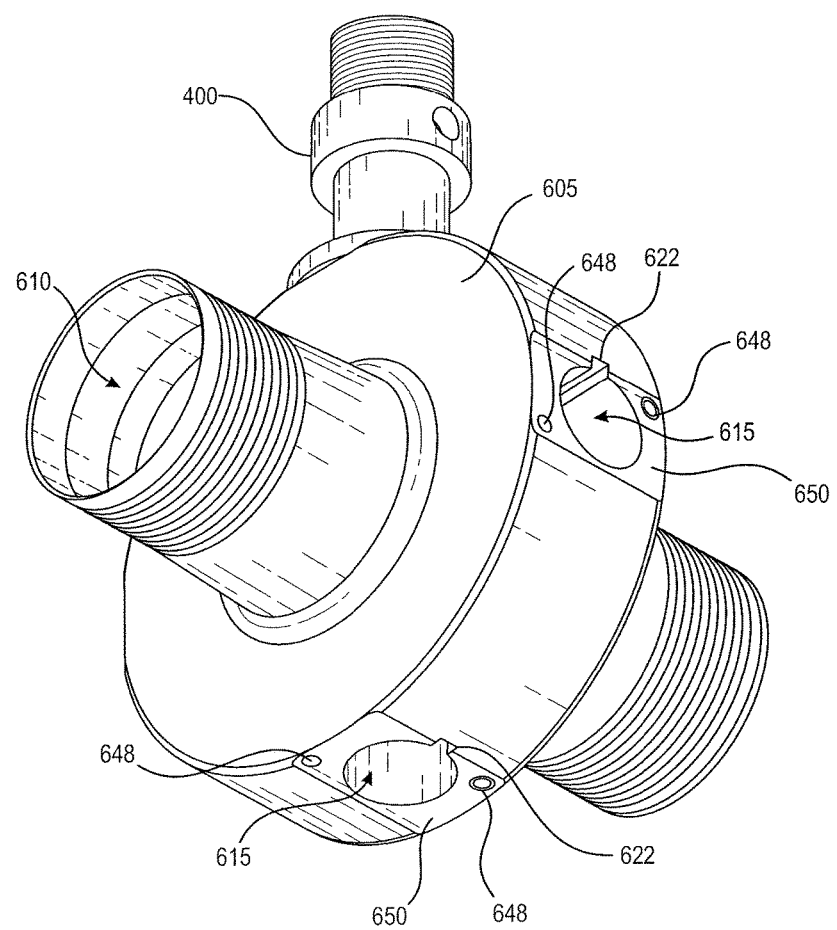
FIG. 15 is a perspective view of another embodiment of a foam injection body suitable for use in a foam injection system constructed in accordance with principles of the present disclosure, illustrating the foam port insert of FIG. 9 removably mounted thereto.
Figure 16:
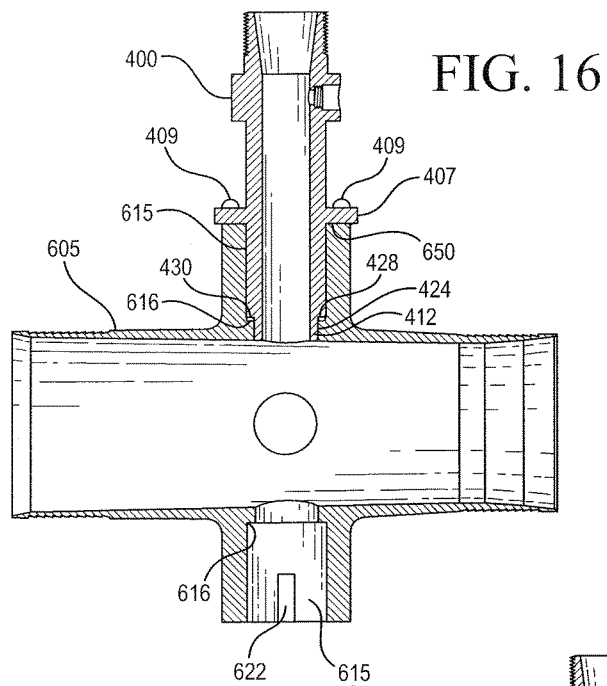
FIG. 16 is a longitudinal cross-sectional view of the foam injection body and the foam port insert of FIG. 15.
Figure 17:
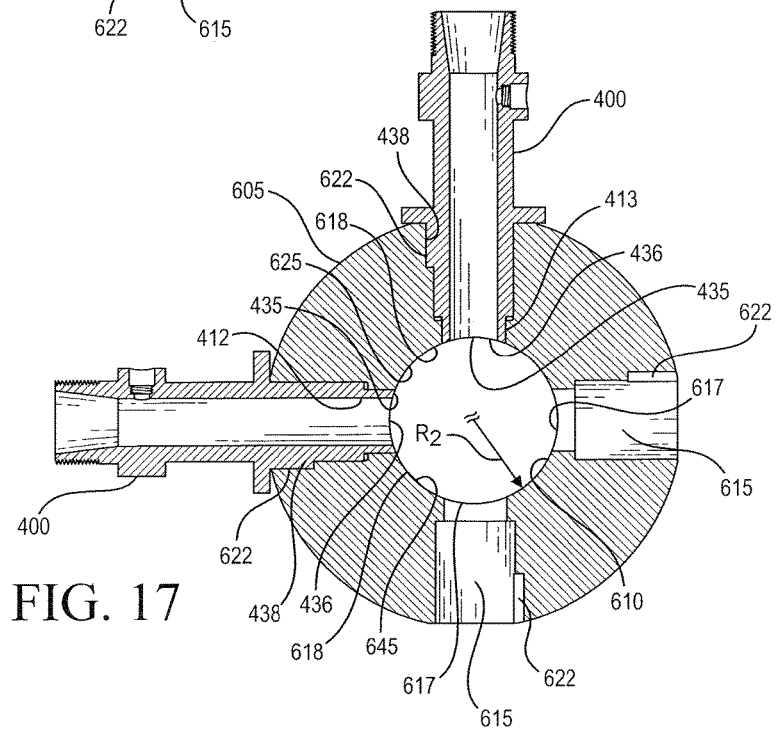
FIG. 17 is a transverse cross-sectional view of the foam injection body, illustrating foam port inserts similar in construction to the foam port of FIG. 9 removably mounted thereto.

Referring to FIGS. 15-17, an embodiment of a foam injection body 605 constructed in accordance with principles of the present disclosure is disclosed. Referring to FIG. 15, the foam port insert 400 of FIG. 9 is removably mounted to the foam injection body 605. The foam injection body 605 of FIG. 9 is compatible with the first and second types of foam port inserts 400, 500 shown in FIGS. 9 and 14, respectively. The first and second types of foam ports 400, 500 shown in FIGS. 9 and 14, respectively, and the foam injection body 605 of FIG. 15 comprise an embodiment of a foam injection system constructed in accordance with principles of the present disclosure.

In embodiments, a suitable number of the first and second types of foam port inserts 400, 500 can be associated with the foam injection body 605. The first and second types of foam port inserts 400, 500 can be interchangeably used with the foam injection body 605 to inject aqueous foam into a flow of cementitious slurry passing through the foam injection body 605 under different flow conditions. In embodiments, a foam injection system according to principles of the present disclosure can include more than two types of foam port inserts, each with a foam passageway having a different shape and/or size configured to produce at least one variable flow characteristic through the use of the different types of foam port inserts. In embodiments, a foam injection system according to principles of the present disclosure can include a set of different types of foam port inserts which have a variable inner diameter over a predetermined range of orifice sizes. In embodiments, at least two different types of foam port inserts 400, 500 can be removably mounted within the respective port passageways of the foam injection body at a given time.

Referring to FIGS. 15-17, the illustrated foam injection body 605 includes four port passageways 615 in fluid communication with the slurry passageway 610. Each of the illustrated port passageways 615 has a similar construction. Accordingly, it should be understood that the description of one port passageway 615 is equally applicable to each of the other port passageways 615, as well. In embodiments, the foam injection body 605 defines a different number of port passageways 615 in fluid communication with the slurry passageway 610. In embodiments, the foam injection system can include a number of first and second foam port inserts 400, 500 each corresponding to the number of port passageways 615 in the foam injection body 605.

Referring to FIG. 15, for each port passageway 615, the foam injection body 605 defines a pair of mating mounting holes 648 in a generally-planar seating face 650 of the foam injection body 605. The seating face 650 is configured to engagingly contact the mounting flange 407 of any of the first and second types of foam port inserts 400, 500 for the removable mounting of the foam port insert 400, 500 to the foam injection body 605.

The mating mounting holes 648 can be configured such that the mounting holes 408 of the mounting flange 407 are alignable with the mating mounting holes 648 of the foam injection body 605 when the mounting end 412 of the respective foam port insert 400, 500 is aligned with the associated port passageway 615 and the mounting flange 407 is adjacent the foam injection body 605 (see FIG. 16 also). The mating mounting holes 648 can have an internal threaded surface which is configured to threadingly engage a suitable fastener 409. In the illustrated embodiment, the mounting holes 408 of the respective foam port insert 400, 500 are in aligned relationship with the mating mounting holes 648 of the foam injection body when the rib 438 of the foam port insert 400, 500 is disposed within the keyway 622 of the port passageway 615 with which the foam port insert 400, 500 is associated.

Referring to FIG. 16, the foam port insert 400 is disposed within one of the port passageways 615 of the foam injection body 605. A pair of threaded fasteners 409 respectively extends through the mounting holes of the mounting flange 407 of the foam port insert 400 and is respectively threadingly engaged with an internal threaded surface within the mating mounting holes of the foam injection body 605 to removably mount the foam port insert 400 to the foam injection body 605. With the mounting flange 407 of the foam port insert 400 seated upon the seating face 650 of the foam injection body 605, the o-ring 430 disposed about the distal portion 424 of the mounting end 412 of the foam port insert 400 is sealingly compressed between the sealing face 428 of the foam port insert 400 and the counterbore sealing surface 616 of the foam injection body 605 to provide a sealing relationship therebetween.

Referring to FIG. 17, the illustrated foam injection body 605 is in the form of a foam ring which can be used as a part of a discharge conduit. The illustrated foam injection body 605 has an inner circumferential surface 645 defining the slurry passageway 610. The inner circumferential surface 645 has a concave portion 618 adjacent each port passageway 615 with a radius of curvature $R_2$ substantially the same as the curved distal end face of the first port insert. Each of the different types of foam port insert 400, 500 is adapted to removably mount to the foam injection body 605 such that the mounting end 412, 512 of the foam port insert 400, 500 is disposed within the port passageway 615 and the distal end face 435, 535 of the foam port insert 400, 500 is substantially aligned with the inner surface 625 of the foam injection body 605 which defines the slurry passageway 610.

Referring to FIGS. 15-17, each port passageway 615 of the illustrated foam injection body 605 includes a keyway 622 configured to retentively receive the rib of one of the first or second types of foam port inserts 400, 500 therein. When either of the first or second types of foam port inserts 400, 500 is mounted to the foam injection body 605, the rib 438 is disposed within the keyway 622, and the foam port insert 400, 500 is substantially constrained from rotating about the longitudinal axis LA relative to the foam injection body 605 by the interengagement of the rib 438 and the keyway 622. In other embodiments, the rib 438 and keyway 622 can each have a different size and/or shape but which is still configured to prevent relative rotation between the foam port insert 400, 500 and the foam injection body 605.

In embodiments, at least one of the foam injection body and the different types of foam port inserts 400, 500 can include an alignment feature adapted to facilitate the flush-mounting feature of the foam port inserts 400, 500 wherein the mounting end 412, 512 of the respective foam port insert 400, 500 is substantially flush with the interior geometry of the slurry passage 610 of the compatible foam injection body 605. The illustrated rib and keyway configuration imparts a mounting polarity for each type of foam port insert 400, 500 such that the foam port inserts 400, 500 are removably mounted to the foam injection body 605 in a particular orientation.

In the illustrated embodiment, the mounting polarity of the first and second types of foam port inserts 400, 500 is configured such that each distal end face 435, 535 of the different types of foam port inserts 400, 500 is disposed in substantially conforming relationship with the inner surface 625 of the foam passageway 610. When mounted to the foam injection body 605, the concave portion 436, 536 of the distal end face 435, 535 of the foam port insert 400, 500 is substantially concentrically disposed with the inner surface 625 of the foam injection body 605 (see FIG. 17) such that the curvature of the distal end face 435, 535 of the foam port insert 400, 500 is aligned with the curvature of the inner surface 625 of the foam injection body 605 to present a substantially flush relationship between the distal end face 435, 535 and the inner surface 625 of the foam injection body 605.

The foam injection body 605 of FIG. 15 can be similar in other respects to the foam injection body 305 of FIG. 6. For example, the slurry passage 610 of the foam injection body 605 can be substantially the same in construction and function as the slurry passage 310 of the foam injection body 305 of FIG. 6.

Figure 18:
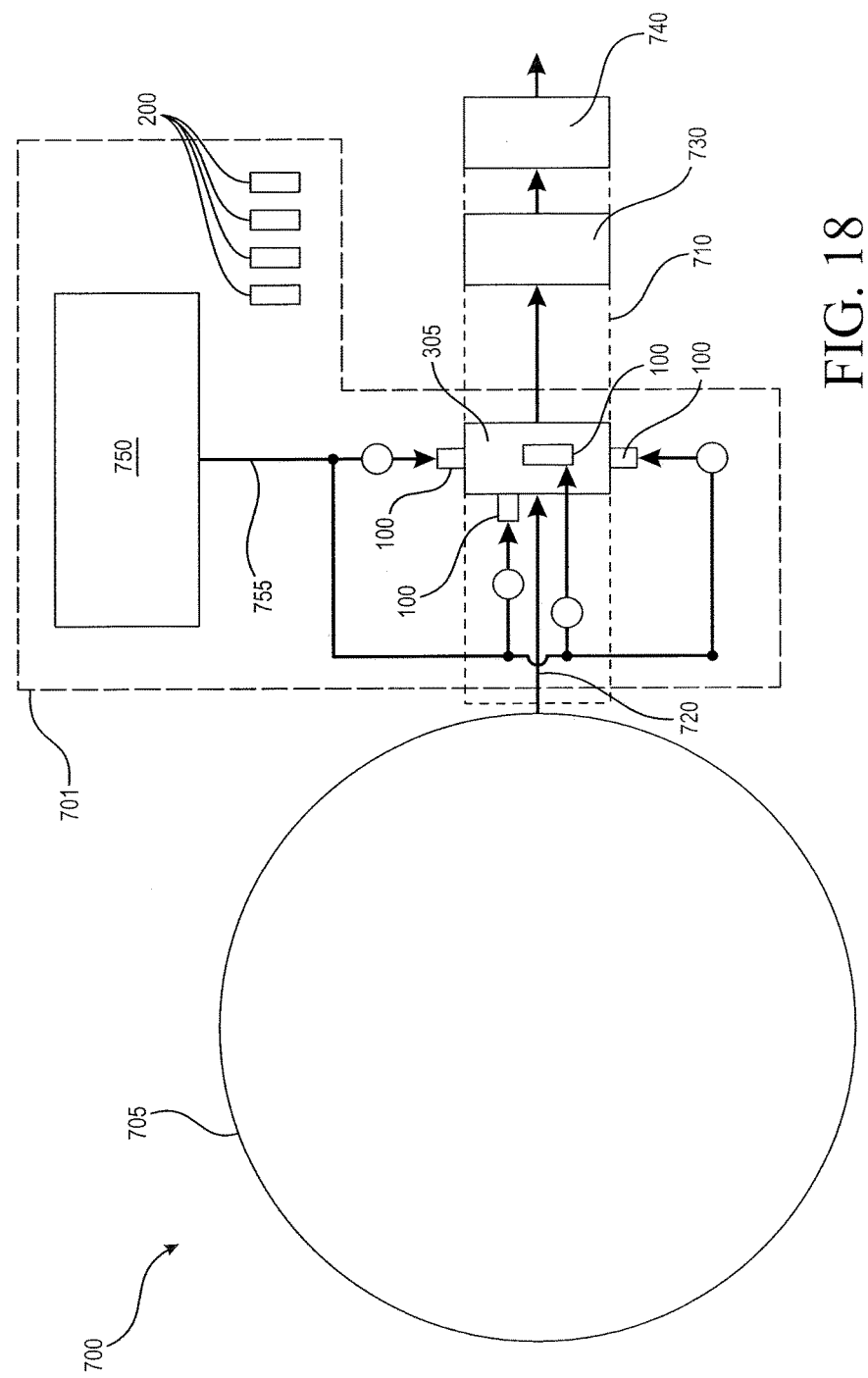
FIG. 18 is a schematic plan diagram of an embodiment of a cementitious slurry mixing and dispensing assembly, including an embodiment of a foam injection system, constructed in accordance with principles of the present disclosure.
Figure 19:
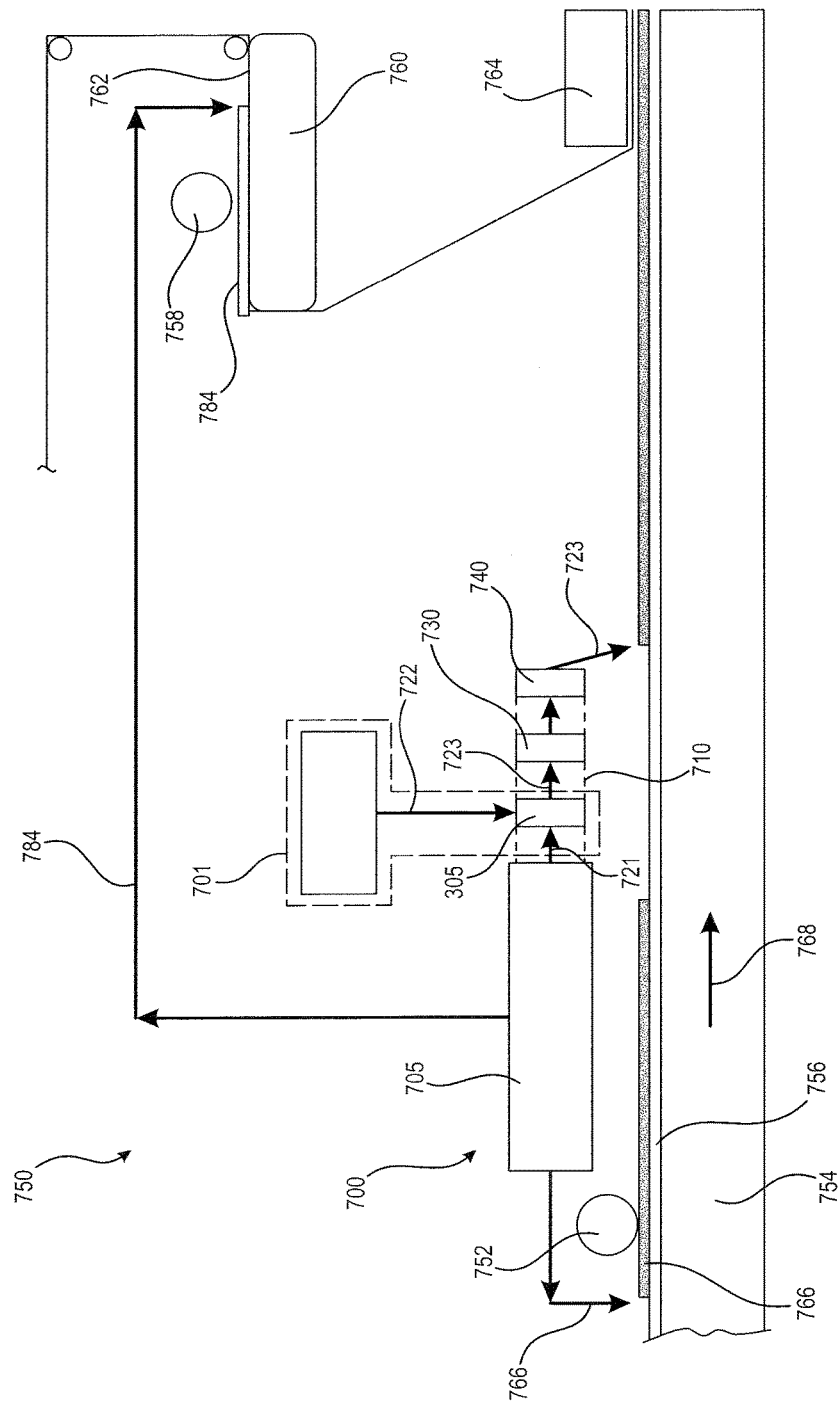
FIG. 19 is a schematic elevational diagram of an embodiment of a wet end of a gypsum wallboard manufacturing line including an embodiment of a foam injection system constructed in accordance with principles of the present disclosure.

In embodiments, a foam injection system 701 constructed in accordance with principles of the present disclosure can be placed in fluid communication with a slurry mixer 705, for example, as shown in FIGS. 18 and 19, to produce a foamed cementitious slurry. In embodiments, the foam injection system 701 can be placed in fluid communication with the mixer 705 by being attached directly to the mixer 705 and/or a discharge conduit 710 attached to, and in fluid communication with, the mixer 705.

Referring to FIG. 18, an embodiment of a cementitious slurry mixing and dispensing assembly 700 constructed in accordance with principles of the present disclosure is shown. The cementitious slurry mixing and dispensing assembly 700 includes a mixer 705, a slurry discharge conduit 710, and a foam injection system 701.

The mixer 705 is adapted to agitate water and a cementitious material to form aqueous cementitious slurry. The slurry mixer 705 is in fluid communication with the discharge conduit 710 and the foam injection system 701. Both the water and the cementitious material can be supplied to the mixer 705 via one or more inlets as is known in the art. In embodiments, any other suitable slurry additive can be supplied to the mixer 705 as is known in the art of manufacturing cementitious products. Any suitable mixer (e.g., a pin mixer) can be used with the slurry mixing and dispensing assembly 700.

The slurry discharge conduit 710 is in fluid communication with the mixer 705. In embodiments, the slurry discharge conduit 710 can comprise any suitable discharge conduit component as will be appreciated by one skilled in the art. The illustrated discharge conduit 710 includes a delivery conduit 720, a foam injection body 305 of the foam injection system 701, a flow-modifying element 730, and a slurry distributor 740.

The discharge conduit 710 is configured to deliver a main flow of cementitious slurry from the mixer downstream to a further manufacturing station (e.g., upon a moving web of cover sheet material in embodiments used to produce gypsum wallboard). In embodiments, the delivery conduit 720 can be made from any suitable material and can have different shapes. In some embodiments, the delivery conduit 720 can comprise a flexible conduit.

In embodiments, the flow-modifying element 730 is a part of the discharge conduit 710 and is adapted to modify a flow of cementitious slurry from the mixer 705 through the discharge conduit 710. The flow-modifying element 730 is disposed downstream of the foam injection body 305 relative to a flow direction of the flow of cementitious slurry from the mixer 705 through the discharge conduit 710. In embodiments, one or more flow-modifying elements 730 can be associated with the discharge conduit 710 and adapted to control a main flow of slurry discharged from the slurry mixer 705. The flow-modifying element(s) 730 can be used to control an operating characteristic of the main flow of aqueous cementitious slurry. In the illustrated embodiment of FIGS. 18 and 19, the flow-modifying element(s) 730 is associated with the discharge conduit 710. Examples of suitable flow-modifying elements include volume restrictors, pressure reducers, constrictor valves, canisters etc., including those described in U.S. Pat. Nos. 6,494,609; 6,874,930; 7,007,914; and 7,296,919, for example.

In embodiments, the slurry distributor 740 can be any suitable terminal portion of a conventional discharge conduit, such as a length of conduit in the form of a flexible hose or a component commonly referred to as a "boot." In embodiments, the boot can be in the form of a multi-leg discharge boot.

In other embodiments, the slurry distributor 740 can be similar to those shown and described in U.S. Patent Application Nos. 2012/0168527; 2012/0170403; 2013/0098268; 2013/0099027; 2013/0099418; 2013/0100759; 2013/0216717; 2013/0233880; and 2013/0308411. In some of such embodiments, the discharge conduit 710 can include suitable components for splitting a main flow of cementitious slurry into two flows which are re-combined in the slurry distributor 740.

The foam injection system 701 is arranged with at least one of the mixer 705 and the slurry discharge conduit 710. The foam injection system 701 can include a foam source 750 (e.g., such as a foam generation system configured as known in the art), a foam supply conduit 755, a foam injection body 305, at least one first type of foam port insert 100, and at least one second type of foam port insert 200. In the illustrated embodiment, the foam injection system includes at least four of the first type of foam port inserts 100 and at least four of the second type of foam port inserts 200.

In embodiments, any suitable foam source 750 can be used. Preferably, the aqueous foam is produced in a continuous manner in which a stream of a mix of foaming agent and water is directed to a foam generator, and a stream of the resultant aqueous foam leaves the generator and is directed to and mixed with the cementitious slurry. In embodiments, any suitable foam source and foaming agent can be used. Some examples of suitable foaming agents are described in U.S. Pat. Nos. 5,683,635 and 5,643,510, for example.

In embodiments, aqueous foam from the foam source 750 can be added to the constituent materials through the foam supply conduit 755 and at least one of the foam port inserts 100, 200 at any suitable location downstream of the mixer 102 and/or in the mixer 102 itself (with a suitable foam injection body) to form a foamed cementitious slurry. In embodiments, the aqueous foam supply conduit 755 can be in fluid communication with at least one of the slurry mixer 705 and the delivery conduit 710. In the illustrated embodiment, the foam supply conduit 755 is disposed downstream of the slurry mixer 705. In the illustrated embodiment, the aqueous foam supply conduit 755 has a manifold-type arrangement for supplying foam to four foam port inserts 100 removably mounted to the foam injection body 305, which is in the form of an injection ring or block associated with the discharge conduit 710.

In other embodiments, one or more secondary foam supply conduits can be provided, each of which being in fluid communication with the mixer 705. In yet other embodiments, the aqueous foam supply conduit(s) can be in fluid communication with the slurry mixer alone 705. As will be appreciated by those skilled in the art, the means for introducing aqueous foam into the cementitious slurry in the slurry mixing and dispensing assembly 700, including its relative location in the assembly, can be varied and/or optimized to provide a uniform dispersion of aqueous foam in the cementitious slurry to produce board that is fit for its intended purpose.

In embodiments, the foam injection body 305 comprises a part of at least one of the mixer 705 and the slurry discharge conduit 710. The illustrated foam injection body 305 comprises a part of the discharge conduit 710. The foam injection body 305 can define a slurry passageway and at least one port passageway as explained above. The slurry passageway is configured to convey cementitious slurry therethrough and, in the illustrated embodiment, forms a part of the discharge conduit 710. In embodiments, the foam injection body 305 defines at least two port passageways. The illustrated foam injection body 305 defines four port passageways.

Each port passageway has a port opening in fluid communication with the slurry passageway. The foam injection system 701 can include a number of each of the first and second types of foam port inserts 100, 200 which corresponds to the number of port passageways in the foam injection body 305.

The illustrated foam injection body 305 comprises a foam ring which has an outer circumferential surface and an inner circumferential surface in spaced radial relationship to the outer circumferential surface. Each port passageway extends radially between the outer circumferential surface and the inner circumferential surface. The inner circumferential surface defines the slurry passageway.

Each of the first type of foam port inserts 100 defines a first foam passageway having a first orifice with a first orifice size, as explained above. The first type of foam port insert 100 is adapted to be removably mounted to the foam injection body 305 such that the first foam passageway is in fluid communication with the slurry passageway via the port opening of the port passageway.

Each of the second type of foam port inserts 200 defines a second foam passageway having a second orifice with a second orifice size, as explained above. The second type of foam port insert 200 is adapted to be removably mounted to the foam injection body 305 such that the second foam passageway is in fluid communication with the slurry passageway via the port opening of the port passageway. The second orifice size is different than the first orifice size.

In use, a main flow of cementitious slurry is discharged from the mixer 705 into the discharge conduit 710, aqueous foam is inserted into the main flow of cementitious slurry traveling through the foam injection body 305 via a flow of aqueous foam passing through each of the first type of foam port inserts 100 removably mounted to the foam injection body 305 to produce a flow of foamed slurry. The flow-modifying element(s) 730 controls an operating characteristic of the flow of foamed slurry. The flow of foamed slurry is directed into the slurry distributor 740, which can be any suitable terminal portion of a discharge conduit 710. To vary the flow of aqueous foam into the cementitious slurry passing through the foam injection body 305, the first type of foam port inserts 100 can be replaced by the second type of foam port inserts 200.

When the foamed cementitious slurry sets and is dried, the foam dispersed in the slurry produces air voids therein which act to lower the overall density of the cementitious product. The amount of foam and/or amount of air in the foam can be varied to adjust the density of the dry cementitious product such that the resulting product is within a desired weight range.

Referring to FIG. 19, an exemplary embodiment of a wet end 750 of a gypsum wallboard manufacturing line is shown. The illustrated wet end 750 includes the cementitious slurry mixing and dispensing assembly 700 including the foam injection system 701 according to principles of the present disclosure, a hard edge/face skim coat roller 752 disposed upstream of the slurry distributor 740 of the discharge conduit 710 and supported over a forming table 754 such that a first moving web 756 of cover sheet material is disposed therebetween, a back skim coat roller 758 disposed over a support element 760 such that a second moving web 762 of cover sheet material is disposed therebetween, and a forming station 764 adapted to shape the preform into a desired thickness. The skim coat rollers 752, 758, the forming table 754, the support element 760, and the forming station 764 can all comprise conventional equipment suitable for their intended purposes as is known in the art. The wet end 750 can be equipped with other conventional equipment as is known in the art.

Water and calcined gypsum can be mixed in the mixer 705 to form an aqueous calcined gypsum slurry. In some embodiments, the water and calcined gypsum can be continuously added to the mixer in a water-to-calcined gypsum ratio from about 0.5 to about 1.3, and in other embodiments of about 0.75 or less.

Gypsum board products are typically formed "face down" such that the advancing web 156 serves as the "face" cover sheet of the finished board. A face skim coat/hard edge stream 766 (a layer of denser aqueous calcined gypsum slurry relative to at least one of the first and second flows of aqueous calcined gypsum slurry) can be applied to the first moving web 756 upstream of the hard edge/face skim coat roller 752, relative to the machine direction 768, to apply a skim coat layer to the first web 756 and to define hard edges of the board.

Referring to FIGS. 7 and 18, the foam injection system 701 can be used to inject aqueous foam into the calcined gypsum slurry produced by the mixer 705. A main flow 721 of aqueous calcined gypsum slurry is discharged from the mixer 705 into the discharge conduit 710 including the foam injection body 305. The main flow 721 of aqueous calcined gypsum slurry enters the slurry passageway defined in the foam injection body 305. A flow 722 of aqueous foam is conveyed to each foam passageway 115 of the first type of foam port inserts 100, which are removably mounted to a foam injection body 305 (see FIG. 7 also). The flow 722 of aqueous foam in each of the foam passageways 115 of the first port inserts 100 is injected through the respective port opening 317 into the main flow 721 of aqueous calcined gypsum slurry passing through the slurry passageway 310 to form a flow 723 of foamed calcined gypsum slurry. The flow 723 of foamed calcined gypsum slurry can be acted upon by one or more flow-modifying elements 730 and discharged from the slurry distributor 740 of the discharge conduit 710 upon the first moving web 756.

To vary the flow of aqueous foam into the main flow 721 of aqueous calcined gypsum slurry passing through the slurry passageway 310, the first type of foam port inserts 100 can be removed and replaced with the second type of foam port inserts 200. In embodiments, the second type of foam port inserts 200 are adapted to vary a flow condition of the flow of aqueous foam therethrough relative to the flow of the aqueous foam through the first type of foam port inserts. In embodiments, the first and second types of foam port inserts 100, 200 have different orifice sizes. In embodiments, the flow of aqueous foam through the first type of foam port inserts 100, 200 has a different pressure than the flow of aqueous foam through the second type of foam port inserts.

The face skim coat/hard edge stream 766 can be deposited from the mixer 705 at a point upstream, relative to the direction of movement of the first moving web 756 in the machine direction 768, of where the flow 723 of foamed calcined gypsum slurry is discharged from the discharge conduit 710 upon the first moving web 756. A back skim coat stream 784 (a layer of denser aqueous calcined gypsum slurry relative to the main flow of foamed calcined gypsum slurry) can be applied to the second moving web 762. The back skim coat stream 784 can be deposited from the mixer 705 at a point upstream, relative to the direction of movement of the second moving web 762, of the back skim coat roller 758. The second moving web 762 of cover sheet material can be placed upon the foamed slurry discharged from the discharge conduit 710 upon the advancing first web 756 to form a sandwiched wallboard preform that is fed to the forming station 764 to shape the preform to a desired thickness. In embodiments, aqueous foam or other agents can be added to the slurry comprising the face skim coat and/or back skim coat to reduce its density, but at a density that is greater than the foamed slurry dispensed from the discharge conduit 710.

In one aspect of the present disclosure, exemplary embodiments of a foam injection system constructed in accordance with principles of the present disclosure can be used in a cementitious slurry mixing and dispensing assembly. In embodiments, a foam injection system includes a foam injection body, a first port insert, and a second port insert. The foam injection body defines a slurry passageway and a port passageway. The port passageway has a port opening in fluid communication with the slurry passageway. The first port insert defines a first foam passageway having a first orifice with a first orifice size. The first port insert is adapted to removably mount to the foam injection body such that the first foam passageway is in fluid communication with the slurry passageway via the port opening of the port passageway. The second port insert defines a second foam passageway having a second orifice with a second orifice size. The second port insert is also adapted to removably mount to the foam injection body such that the second foam passageway is in fluid communication with the slurry passageway via the port opening of the port passageway. The second orifice size is different than the first orifice size.

In a first variation of foam injection system embodiments, the foam injection body defines at least two port passageways. Each port passageway has a port opening in fluid communication with the slurry passageway. The foam injection system further comprises a number of first and second port inserts each corresponding to the number of port passageways in the foam injection body.

In some of the first variation of foam injection system embodiments, the foam injection body comprises a foam ring having an outer circumferential surface and an inner circumferential surface in spaced radial relationship to the outer circumferential surface. The port passageway extends radially between the outer circumferential surface and the inner circumferential surface, and the inner circumferential surface defines the slurry passageway.

In a second variation of foam injection system embodiments, the first port insert includes a port insert body having a foam supply end and a mounting end. The foam supply end is adapted for retentive engagement with a foam supply conduit and defines a foam inlet opening. The mounting end defines a foam outlet opening. The first foam passageway extends between and in fluid communication with the foam inlet opening and the foam outlet opening.

In a first set of the second variation of foam injection system embodiments, the foam inlet opening is larger than the first orifice, and the first foam passageway includes a tapered entry portion and a main portion. The tapered entry portion includes the foam inlet opening and an entry outlet opening in fluid communication with the main portion. The entry outlet opening is smaller than the foam inlet opening and corresponds to the first orifice size such that the entry portion narrows from the foam inlet opening to the entry outlet opening. The main portion includes the foam outlet opening and has a cross-sectional size corresponding to the first orifice size. In some of the first set of the second variation of foam injection system embodiments, the first port insert defines a pressure sensor passageway in fluid communication with the main portion of the first foam passageway.

In a second set of the second variation of foam injection system embodiments, the mounting end includes a threaded surface adapted to retentively engage a mating threaded surface of the foam injection body associated with the port passageway. In some of the these embodiments, the threaded surface of the mounting end defines an axis of rotation about which the first port insert rotates to threadingly engage and disengage the mating threaded surface of the foam injection body, and the port insert body includes a pair of planar surfaces in spaced relationship to each other. The planar surfaces are substantially parallel to each other and to the axis of rotation.

In a third variation of foam injection system embodiments, the first port insert includes a port insert body having a foam supply end and a mounting end. The port insert body extends along a longitudinal axis between the foam supply end and the mounting end. The first port insert includes a mounting flange extending radially outwardly from the port insert body. The mounting flange defines a mounting hole configured to receive a fastener therethrough. The foam injection body defines a mating mounting hole therein configured such that the mounting hole of the mounting flange is alignable with the mating mounting hole of the foam injection body when the mounting end of the first port insert is aligned with the port passageway and the mounting flange is adjacent the foam injection body.

In a first set of the third variation of foam injection system embodiments, the mounting end of the first port insert has a distal end face, and the foam injection body has an inner surface defining the slurry passageway. The first port insert is adapted to removably mount to the foam injection body such that the mounting end of the first port insert is disposed within the port passageway and the distal end face of the first port insert is substantially aligned with the inner surface of the foam injection body.

In a second set of the third variation of foam injection system embodiments, the first port insert includes a rib projecting from the port insert body and extending along the longitudinal axis. The foam injection body defines a keyway configured to retentively receive the rib therein such that the first port insert is substantially constrained from rotating about the longitudinal axis relative to the foam injection body by the interengagement of the rib and the keyway.

In some of the second set of the third variation of foam injection system embodiments, the mounting end of the first port insert has a distal end face with a concave portion having a radius of curvature, and the foam injection body has an inner curved surface defining the slurry passageway. The inner curved surface has a concave portion adjacent the port passageway with a radius of curvature substantially the same as the concave portion of the distal end face of the first port insert. The first port insert is adapted to removably mount to the foam injection body such that the mounting end of the first port insert is disposed within the port passageway and the concave portion of the distal end face of the first port insert is substantially concentrically disposed with respect to the concave portion of the foam injection body to define a substantially flush interface therebetween.

In a fourth variation of foam injection system embodiments, the mounting end of the first port insert has a distal end face, and the foam injection body has an inner surface defining the slurry passageway. The first port insert is adapted to removably mount to the foam injection body such that the mounting end of the first port insert is disposed within the port passageway and the distal end face of the first port insert is adjacent the inner surface of the foam injection body.

In a fifth variation of foam injection system embodiments, the first port insert includes a port insert body having a foam supply end and a mounting end. The port insert body extends along a longitudinal axis between the foam supply end and the mounting end. The first port insert includes a rib projecting from the port insert body and extending along the longitudinal axis. The foam injection body defines a keyway configured to retentively receive the rib therein such that the first port insert is substantially constrained from rotating about the longitudinal axis relative to the foam injection body by the interengagement of the rib and the keyway.

In a sixth variation of foam injection system embodiments, the first port insert defines a pressure sensor passageway in fluid communication with the first foam passageway.

In another aspect of the present disclosure, exemplary embodiments of a cementitious slurry mixing and dispensing assembly constructed in accordance with principles of the present disclosure can include a foam injection system adapted to inject aqueous foam into a flow of cementitious slurry produced in the assembly. In embodiments, a slurry mixing and dispensing assembly includes a mixer, a slurry discharge conduit, and a foam injection system.

The mixer is adapted to agitate water and a cementitious material to form aqueous cementitious slurry. The slurry discharge conduit is in fluid communication with the mixer.

The foam injection system is arranged with at least one of the mixer and the slurry discharge conduit. The foam injection system includes a foam injection body, a first port insert, and a second port insert.

The foam injection body comprises a part of at least one of the mixer and the slurry discharge conduit. The foam injection body defines a slurry passageway and a port passageway. The slurry passageway is configured to convey cementitious slurry therethrough. The port passageway has a port opening in fluid communication with the slurry passageway.

The first port insert defines a first foam passageway having a first orifice with a first orifice size. The first port insert is adapted to removably mount to the foam injection body such that the first foam passageway is in fluid communication with the slurry passageway via the port opening of the port passageway.

The second port insert defines a second foam passageway having a second orifice with a second orifice size. The second port insert is adapted to removably mount to the foam injection body such that the second foam passageway is in fluid communication with the slurry passageway via the port opening of the port passageway. The second orifice size is different than the first orifice size.

In some embodiments of a cementitious slurry mixing and dispensing assembly, the foam injection body comprises a part of the discharge conduit. In some of such embodiments, the foam injection body comprises a foam ring having an outer circumferential surface and an inner circumferential surface in spaced radial relationship to the outer circumferential surface. The port passageway extends radially between the outer circumferential surface and the inner circumferential surface, and the inner circumferential surface defines the slurry passageway.

In some embodiments of a cementitious slurry mixing and dispensing assembly, the foam injection body defines at least two port passageways. Each port passageway has a port opening in fluid communication with the slurry passageway. The assembly further comprises a number of first and second port inserts each corresponding to the number of port passageways in the foam injection body.

In some embodiments of a cementitious slurry mixing and dispensing assembly, the assembly further comprises a flow-modifying element associated with the discharge conduit and adapted to modify a flow of cementitious slurry from the mixer through the discharge conduit. The flow-modifying element is disposed downstream of the foam injection body relative to a flow direction of the flow of cementitious slurry from the mixer through the discharge conduit.

In another aspect of the present disclosure, a foam injection system constructed in accordance with principles of the present disclosure can be used in a variety of manufacturing processes. For example, in embodiments, a foam injection system can be used in a method of preparing a cementitious product, such as a gypsum board.

In embodiments of a method of preparing a cementitious product, a main flow of aqueous cementitious slurry is discharged from a mixer. The main flow of aqueous cementitious slurry is passed through the slurry passage of the foam injection body.

A flow of aqueous foam is conveyed to a first foam passageway of a first port insert, which is removably mounted to a foam injection body. The foam injection body defines a slurry passageway and a port passageway. The port passageway has a port opening in fluid communication with the slurry passageway. The first port insert is removably mounted to the foam injection body such that the first foam passageway is in fluid communication with the slurry passageway via the port opening of the port passageway. The flow of aqueous foam in the first foam passageway of the first port insert is injected under a first flow condition into a flow of aqueous cementitious slurry passing through the slurry passageway to form a flow of foamed cementitious slurry. The main flow of aqueous cementitious slurry from the mixer can comprise the flow of aqueous cementitious slurry passing through the slurry passageway into which the flow of aqueous foam in the first foam passageway of the first port insert is injected to form the flow of foamed cementitious slurry.

In embodiments, the pressure of the flow of aqueous foam in the first foam passageway of the first port insert can be measured. In embodiments, the first type of foam port insert can be removed and replaced with another type of foam port insert configured to produce a different pressure of the flow of aqueous foam in the other type of foam port insert.

The first foam port insert can be disengaged from the foam injection body. A second port insert can be removably mounted to the foam injection body. The second port insert defined a second foam passageway. The second port insert is removably mounted to the foam injection body such that the second foam passageway is in fluid communication with the slurry passageway via the port opening of the port passageway. The second foam passageway is different than the first foam passageway.

A flow of aqueous foam is conveyed to the second foam passageway of the second port insert removably mounted to the foam injection body. The flow of aqueous foam in the second foam passageway of the second port insert is injected under a second flow condition into a flow of aqueous cementitious slurry passing through the slurry passageway to form a flow of foamed cementitious slurry. The second flow condition is different than the first flow condition.

In embodiments, the first foam passageway of the first port insert has a first orifice with a first orifice size. The second port insert defines a second foam passageway having a second orifice with a second orifice size. The second orifice size is different than the first orifice size.

In embodiments, the flow of aqueous foam exits the first foam passageway of the first port insert for injection into the flow of aqueous cementitious slurry passing through the slurry passageway at a first pressure, and the flow of aqueous foam exits the second foam passageway of the second port insert for injection into the flow of aqueous cementitious slurry passing through the slurry passageway at a second pressure. The first pressure is different than the second pressure.

In embodiments, the foam injection body defines at least two port passageways. Each port passageway has a port opening in fluid communication with the slurry passageway. In such embodiments, a corresponding number of first port inserts are removably mounted to the foam injection body such that the first foam passageway of each of the first port inserts is in fluid communication with the slurry passageway via the port opening of a respective one of the port passageways. A flow of aqueous can be conveyed to each of the first port inserts removably mounted to the foam injection body. The flow of aqueous foam in each of the first port inserts is injected into a flow of aqueous cementitious slurry passing through the slurry passageway to form a flow of foamed cementitious slurry.

The first foam port inserts can be disengaged from the foam injection body. A number of second port inserts corresponding to the number of port passageways can be removably mounted to the foam injection body. Each of the second port inserts defines a second foam passageway having a second orifice with a second orifice size. The second port inserts are removably mounted to the foam injection body such that the second foam passageway of each of the second port inserts is in fluid communication with the slurry passageway via the port opening of a respective one of the port passageways. The second orifice size being different than the first orifice size;

A flow of aqueous foam is conveyed to the second foam passageway of each of the second port inserts removably mounted to the foam injection body. The flow of aqueous foam in the second foam passageway of each of the second port inserts is injected into a flow of aqueous cementitious slurry passing through the slurry passageway to form a flow of foamed cementitious slurry.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A foam injection system for a cementitious slurry mixing and dispensing assembly, the foam injection system comprising:
a foam injection body, the foam injection body defining a slurry passageway and a first port passageway, the first port passageway having a port opening in fluid communication with the slurry passageway, the foam injection body including a body engaging surface;
a first port insert, the first port insert defining a first foam passageway having a first orifice with a first orifice size, the first port insert adapted to removably mount to the foam injection body such that the first foam passageway is in fluid communication with the slurry passageway via the port opening of the first port passageway, the first port insert including a port insert engaging surface adapted to engage the body engaging surface of the foam injection body when the first port insert is mounted thereto such that the first foam passageway is in fluid communication with the slurry passageway via the port opening of the first port passageway; and
a second port insert, the second port insert defining a second foam passageway having a second orifice with a second orifice size, the second port insert adapted to removably mount to the foam injection body instead of the first port insert such that the second foam passageway is in fluid communication with the slurry passageway via the port opening of the first port passageway, and the second orifice size being different than the first orifice size, the second non insert including the port insert engaging surface such that the port insert engaging surface of the second port insert is adapted to engage the body engaging surface of the foam injection body when the second port insert, instead of the first port insert, is mounted to the foam injection body such that the second foam passageway is in fluid communication with the slurry passageway via the port opening of the first port passageway.

2. The foam injection system of claim 1, wherein the foam injection body defines at least two port passageways, each port passageway having a port opening in fluid communication with the slurry passageway, and wherein the foam injection body is configured to permit either the first port insert or the second port insert to be removably mounted to the foam injection body to place the respective first and second foam passageway into fluid communication with each port passageway.

3. The foam injection system of claim 2, wherein the foam injection body comprises a foam ring having an outer circumferential surface and an inner circumferential surface in spaced radial relationship to the outer circumferential surface, the port passageways extending radially between the outer circumferential surface and the inner circumferential surface, and the inner circumferential surface defining the slurry passageway.

4. The foam injection system of claim 1, wherein the first port insert includes a port insert body having a foam supply end and a mounting end, the foam supply end adapted for retentive engagement with a foam supply conduit and defining a foam inlet opening, and the mounting end defining a foam outlet opening, the first foam passageway extending between and in fluid communication with the foam inlet opening and the foam outlet opening.

5. The foam injection system of claim 4, wherein the foam inlet opening is larger than the first orifice and the first foam passageway includes a tapered entry portion and a main portion, the tapered entry portion including the foam inlet opening and an entry outlet opening in fluid communication with the main portion, the entry outlet opening being smaller than the foam inlet opening and corresponding to the first orifice size such that the entry portion narrows from the foam inlet opening to the entry outlet opening, the main portion including the foam outlet opening and having a cross-sectional size corresponding to the first orifice size.

6. The foam injection system of claim 5, wherein the first port insert defines a pressure sensor passageway in fluid communication with the main portion of the first foam passageway.

7. The foam injection system of claim 4, wherein the mounting end includes the port insert engaging surface, the insert engaging surface comprising a threaded surface, the body engaging surface of the foam injection body comprising a mating threaded surface, the threaded surface of the first port insert adapted to retentively engage the mating threaded surface of the foam injection body associated with the first port passageway.

8. The foam injection system of claim 7, wherein the threaded surface of the mounting end defines an axis of rotation about which the first port insert rotates to threadingly engage and disengage the mating threaded surface of the foam injection body, and the port insert body includes a pair of planar surfaces in spaced relationship to each other, the planar surfaces being substantially parallel to each other and to the axis of rotation.

9. The foam injection system of claim 1, wherein the first port insert includes a port insert body having a foam supply end and a mounting end, the port insert body extending along a longitudinal axis between the foam supply end and the mounting end, the first port insert includes a mounting flange extending radially outwardly from the port insert body, the mounting flange defining a mounting hole configured to receive a fastener therethrough, and wherein the foam injection body defines a mating mounting hole therein configured such that the mounting hole of the mounting flange is alignable with the mating mounting hole of the foam injection body when the mounting end of the first port insert is aligned with the first port passageway and the mounting flange is adjacent the foam injection body.

10. The foam injection system of claim 9, wherein the mounting end of the first port insert has a distal end face, and the foam injection body has an inner surface defining the slurry passageway, the first port insert adapted to removably mount to the foam injection body such that the mounting end of the first port insert is disposed within the first port passageway and the distal end face of the first port insert is substantially aligned with the inner surface of the foam injection body.

11. The foam injection system of claim 9, wherein the first port insert includes a rib projecting from the port insert body and extending along the longitudinal axis, the rib including the port insert engaging surface, and wherein the body engaging surface of the foam injection body defines a keyway configured to retentively receive the rib therein such that the first port insert is substantially constrained from rotating about the longitudinal axis relative to the foam injection body by the interengagement of the rib and the keyway.

12. The foam injection system of claim 11, wherein the mounting end of the first port insert has a distal end face with a concave portion having a radius of curvature, and the foam injection body has an inner curved surface defining the slurry passageway, the inner curved surface having a concave portion adjacent the first port passageway with a radius of curvature substantially the same as the concave portion of the distal end face of the first port insert, the first port insert adapted to removably mount to the foam injection body such that the mounting end of the first port insert is disposed within the first port passageway and the concave portion of the distal end face of the first port insert is substantially concentrically disposed with respect to the concave portion of the foam injection body.

13. The foam injection system of claim 1, wherein the mounting end of the first port insert has a distal end face, and the foam injection body has an inner surface defining the slurry passageway, the first port insert adapted to removably mount to the foam injection body such that the mounting end of the first port insert is disposed within the first port passageway and the distal end face of the first port insert is adjacent the inner surface of the foam injection body.

14. The foam injection system of claim 1, wherein the first port insert includes a port insert body having a foam supply end and a mounting end, the port insert body extending along a longitudinal axis between the foam supply end and the mounting end, and the first port insert includes a rib projecting from the port insert body and extending along the longitudinal axis, the mounting end of the first port insert has a distal end face, the foam injection body has an inner surface defining the slurry passageway, and wherein at least one of the foam injection body and the first port insert includes an alignment mechanism adapted to provide the first port insert with a polarity such that the first port insert is removably mounted to the foam injection body with at least one particular orientation with respect to the foam injection body wherein the mounting end of the first port insert is disposed within the first port passageway and the distal end face of the first port insert is substantially aligned with the inner surface of the foam injection body.

15. The foam injection system of claim 1, wherein the first port insert defines a pressure sensor passageway in fluid communication with the first foam passageway.

16. A cementitious slurry mixing and dispensing assembly comprising:
- a mixer adapted to agitate water and a cementitious material to form an aqueous cementitious slurry;
- a slurry discharge conduit in fluid communication with the mixer;
- a foam injection system arranged with at least one of the mixer and the slurry discharge conduit, the foam injection system including:
  - a foam injection body, the foam injection body comprising a part of at least one of the mixer and the slurry discharge conduit, the foam injection body defining a slurry passageway and a first port passageway, the slurry passageway configured to convey cementitious slurry therethrough, the first port passageway having a port opening in fluid communication with the slurry passageway, the foam injection body including a body engaging surface,
  - a first port insert, the first port insert defining a first foam passageway having a first orifice with a first orifice size, the first port insert adapted to removably mount to the foam injection body such that the first foam passageway is in fluid communication with the slurry passageway via the port opening of the first port passageway, the first port insert including a port insert engaging surface adapted to engage the body engaging surface of the foam injection body when the first port insert is mounted thereto such that the first foam passageway is in fluid communication with the slurry passageway via the port opening of the first port passageway, and
  - a second port insert, the second port insert defining a second foam passageway having a second orifice with a second orifice size, the second port insert adapted to removably mount to the foam injection body instead of the first port insert such that the second foam passageway is in fluid communication with the slurry passageway via the port opening of the first port passageway, and the second orifice size being different than the first orifice size, the second port insert including the port insert engaging surface such that the port insert engaging surface of the second port insert is adapted to engage the body engaging surface of the foam injection body when the second port insert, instead of the first port insert, is mounted to the foam injection body such that the second foam passageway is in fluid communication with the slurry passageway via the port opening of the first port passageway.

17. The cementitious slurry mixing and dispensing assembly of claim 16, wherein the foam injection body comprises a part of the discharge conduit.

18. The cementitious slurry mixing and dispensing assembly of claim 17, wherein the foam injection body comprises a foam ring, the foam ring having an outer circumferential surface and an inner circumferential surface in spaced radial relationship to the outer circumferential surface, the first port passageway extending radially between the outer circumferential surface and the inner circumferential surface, and the inner circumferential surface defining the slurry passageway.

19. The cementitious slurry mixing and dispensing assembly of claim 16, wherein the foam injection body defines at least two port passageways, each port passageway having a port opening in fluid communication with the slurry passageway, and wherein the foam injection body is configured to permit either the first port insert or the second port insert to be removably mounted to the foam injection body to place the respective first and second foam passageway into fluid communication with each port passageway.

20. The cementitious slurry mixing and dispensing assembly of claim 16, further comprising:
- a flow-modifying element associated with the discharge conduit and adapted to modify a flow of cementitious slurry from the mixer through the discharge conduit, the flow-modifying element being disposed downstream of the foam injection body relative to a flow direction of the flow of cementitious slurry from the mixer through the discharge conduit.

21. A method of preparing a cementitious product comprising:
- selecting a first port insert from a group including at least the first port insert and a second port insert, the first port insert defining a first foam passageway, and the second port insert defining a second foam passageway, the second foam passageway being different from the first foam passageway to produce a flow therethrough different from that through the first foam passageway, the second port insert being at least one of a different type and a different passageway size than the first port insert;
- removably mounting the first port insert to a foam injection body, the foam injection body defining a slurry passageway and a first port passageway, the first port passageway having a port opening in fluid communication with the slurry passageway, the first port insert removably mounted to the foam injection body such that the first foam passageway is in fluid communication with the slurry passageway via the port opening of the first port passageway, the second port insert removably mountable to the foam injection body in place of the first port insert such that the second foam passageway is in fluid communication with the slurry passageway via the port opening of the first port passageway;
- conveying a flow of aqueous foam to the first foam passageway of the first port insert removably mounted to the foam injection body; and
- injecting the flow of aqueous foam in the first foam passageway of the first port insert under a first flow condition into a flow of aqueous cementitious slurry passing through the slurry passageway to form a flow of foamed cementitious slurry.

22. The method of claim 21, further comprising:
- discharging a main flow of aqueous cementitious slurry from a mixer;
- passing the main flow of aqueous cementitious slurry through the slurry passage of the foam injection body;
- wherein the main flow of aqueous cementitious slurry from the mixer comprises the flow of aqueous cementitious slurry passing through the slurry passageway into which the flow of aqueous foam in the first foam passageway of the first port insert is injected to form the flow of foamed cementitious slurry.

23. The method of claim 21, further comprising:
- measuring the pressure of the flow of aqueous foam in the first foam passageway of the first port insert.

24. The method of claim 21, further comprising:
- disengaging the first foam port insert from the foam injection body;
- removably mounting the second port insert to the foam injection body such that the second foam passageway is in fluid communication with the slurry passageway via the port opening of the first port passageway;

conveying a flow of aqueous foam to the second foam passageway of the second port insert removably mounted to the foam injection body;

injecting the flow of aqueous foam in the second foam passageway of the second port insert under a second flow condition into a flow of aqueous cementitious slurry passing through the slurry passageway to form a flow of foamed cementitious slurry, the second flow condition being different from first flow condition.

25. The method of claim 24, wherein the flow of aqueous foam exits the first foam passageway of the first port insert for injection into the flow of aqueous cementitious slurry passing through the slurry passageway at a first pressure, the flow of aqueous foam exits the second foam passageway of the second port insert for injection into the flow of aqueous cementitious slurry passing through the slurry passageway at a second pressure, and the first pressure is different than the second pressure.

26. The method of claim 21, wherein the foam injection body defines at least two port passageways, each port passageway having a port opening in fluid communication with the slurry passageway, and further comprising:

removably mounting a corresponding number of first port inserts to the foam injection body such that the first foam passageway of each of the first port inserts is in fluid communication with the slurry passageway via the port opening of a respective one of the port passageways;

conveying a flow of aqueous foam to each of the first port inserts removably mounted to the foam injection body;

injecting the flow of aqueous foam in each of the first port inserts into a flow of aqueous cementitious slurry passing through the slurry passageway to form a flow of foamed cementitious slurry.

27. The method of claim 26, further comprising:

disengaging the first foam port inserts from the foam injection body;

removably mounting a number of second port inserts corresponding to the number of port passageways to the foam injection body, each of the second port inserts defining a second foam passageway having a second orifice with a second orifice size, the second port inserts removably mounted to the foam injection body such that the second foam passageway of each of the second port inserts is in fluid communication with the slurry passageway via the port opening of a respective one of the port passageways, and the second orifice size being different than the first orifice size;

conveying a flow of aqueous foam to the second foam passageway of each of the second port inserts removably mounted to the foam injection body;

injecting the flow of aqueous foam in the second foam passageway of each of the second port inserts into a flow of aqueous cementitious slurry passing through the slurry passageway to form a flow of foamed cementitious slurry.

28. The method of claim 21, wherein the foam injection body defines at least two port passageways, each port passageway having a port opening in fluid communication with the slurry passageway, the foam injection body being configured to permit either first port inert or the second port inert to be removably mounted to the foam injection body to place the respective first and second foam passageway into fluid communication with each port passageway, and further comprising:

removably mounting to the foam injection body a set of port inserts including a number of port inserts corresponding to the number of port passageways, the set of port inserts including at least one first port insert and at least one second port insert;

conveying a flow of aqueous foam to each first port insert and each second port insert removably mounted to the foam injection body;

injecting the flow of aqueous foam in each first port insert and in each second port insert into a flow of aqueous cementitious slurry passing through the slurry passageway to form a flow of foamed cementitious slurry.

* * * * *

UNITED STATES PATENT AND TRADEMARK OFFICE
CERTIFICATE OF CORRECTION

PATENT NO. : 10,189,180 B2  
APPLICATION NO. : 14/527417  
DATED : January 29, 2019  
INVENTOR(S) : Wittbold et al.

Page 1 of 1

It is certified that error appears in the above-identified patent and that said Letters Patent is hereby corrected as shown below:

In the Claims

Claim 1, Column 28, Line 64:
"non" should be replaced with -- port --.

Claim 28, Column 34, Line 23:
"either first port inert" should be replaced with -- either the first port insert --.

Claim 28, Column 34, Line 23:
"inert" should be replaced with -- insert --.

Signed and Sealed this
Thirtieth Day of April, 2019

Andrei Iancu
*Director of the United States Patent and Trademark Office*